(12) United States Patent
Ito et al.

(10) Patent No.: US 10,957,208 B2
(45) Date of Patent: Mar. 23, 2021

(54) MOBILE BODY MANAGEMENT SYSTEM, CONTROL METHOD FOR MOBILE BODY MANAGEMENT SYSTEM, AND MANAGEMENT SERVER FOR MOBILE BODY MANAGEMENT SYSTEM

(71) Applicant: HONDA MOTOR CO., LTD., Tokyo (JP)

(72) Inventors: Yo Ito, Tokyo (JP); Makoto Nagai, Wako (JP); Shotaro Odate, Wako (JP); Takashi Sono, Wako (JP); Akihiko Fujiwara, Wako (JP); Kohei Matsumoto, Wako (JP); Fumiya Hirose, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/771,712

(22) PCT Filed: Mar. 19, 2019

(86) PCT No.: PCT/JP2019/011306
§ 371 (c)(1),
(2) Date: Jun. 11, 2020

(87) PCT Pub. No.: WO2019/181896
PCT Pub. Date: Sep. 26, 2019

(65) Prior Publication Data
US 2021/0005094 A1    Jan. 7, 2021

(30) Foreign Application Priority Data

Mar. 19, 2018 (JP) .............................. JP2018-051439

(51) Int. Cl.
*G08G 5/00* (2006.01)
*G08G 1/00* (2006.01)
(Continued)

(52) U.S. Cl.
CPC ........... *G08G 5/0043* (2013.01); *B64C 39/00* (2013.01); *B64C 39/024* (2013.01);
(Continued)

(58) Field of Classification Search
CPC .. G08G 1/00; G08G 1/16; G08G 5/00; G08G 5/0043; G08G 5/0013; G08G 5/0026;
(Continued)

(56) References Cited

U.S. PATENT DOCUMENTS 8,855,374 B2 * 10/2014 Fryshman ............... A01M 1/06
382/110
9,196,164 B1   11/2015 Urmson et al.
(Continued)

FOREIGN PATENT DOCUMENTS

| JP | 2007-334500 | 12/2007 |
| WO | 2017/159176 | 9/2017 |
| WO | 2017/216854 | 12/2017 |

OTHER PUBLICATIONS

Written Opinion for International Application No. PCT/JP2019/011306 dated May 21, 2019, 4 pages.
(Continued)

*Primary Examiner* — Yonel Beaulieu
(74) *Attorney, Agent, or Firm* — Amin, Turocy & Watson, LLP

(57) ABSTRACT

A management system that comprises a movement management part that: communicates via communication devices with a plurality of mobile bodies that include autonomous mobile bodies that comprise an autonomous control part that is for autonomous movement; and manages the movement of the plurality of mobile bodies. The autonomous mobile bodies comprise a display device that performs outward-facing display. The movement management part has a superiority determination part that, on the basis of individual
(Continued)

information for the plurality of mobile bodies, determines a preference ranking for the movement of the plurality of mobile bodies. The autonomous mobile bodies comprise a display control part that controls the display of the display device in accordance with the preference ranking determined by the superiority determination part.

34 Claims, 9 Drawing Sheets

(51) Int. Cl.
    *G08G 1/16*     (2006.01)
    *B64C 39/00*     (2006.01)
    *G05D 1/02*     (2020.01)
    *B64C 39/02*     (2006.01)

(52) U.S. Cl.
    CPC ......... *G05D 1/0214* (2013.01); *G08G 5/0013* (2013.01); *G08G 5/0026* (2013.01); *G08G 5/0069* (2013.01); *B64C 2201/12* (2013.01)

(58) Field of Classification Search
    CPC .... G08G 5/0069; B64C 39/00; B64C 39/024; B64C 2201/12; G05D 1/00; G05D 1/02
    See application file for complete search history.

(56) References Cited

U.S. PATENT DOCUMENTS

| | | | |
|---|---|---|---|
| 9,381,646 B1* | 7/2016 | Fryshman | A01M 5/04 |
| 10,026,165 B1* | 7/2018 | Fryshman | A01M 3/007 |
| 10,043,263 B1* | 8/2018 | Fryshman | A01M 1/2094 |
| 2015/0339931 A1 | 11/2015 | Yu et al. | |
| 2018/0099765 A1* | 4/2018 | Lee | B64G 1/405 |
| 2018/0124572 A1* | 5/2018 | Cardoso de Moura | H04W 4/023 |
| 2018/0204320 A1* | 7/2018 | Fryshman | A01M 3/007 |
| 2018/0240230 A1* | 8/2018 | Fryshman | B64D 1/18 |
| 2018/0335779 A1* | 11/2018 | Fisher | B64C 39/024 |
| 2018/0364711 A1* | 12/2018 | Goldfain | G07C 5/085 |
| 2019/0147751 A1 | 5/2019 | Sasao | |
| 2019/0265002 A1* | 8/2019 | Fougnies | F41G 3/02 |
| 2019/0311625 A1* | 10/2019 | Anvari | H04W 4/02 |

OTHER PUBLICATIONS

International Search Report and Written Opinion for International Application No. PCT/JP2019/011306 dated May 21, 2019, 10 pages.

* cited by examiner

FIG. 3

| GEOGRAPHIC UNIT CLASSIFICATION | MACHINE CLASSIFICATION | | |
|---|---|---|---|
| | SECOND MACHINE CLASSIFICATION FIRST TYPE | FIRST MACHINE CLASSIFICATION | |
| | | SECOND TYPE (GENERAL MACHINE CLASSIFICATION) | THIRD TYPE (EMERGENCY MACHINE CLASSIFICATION) |
| GEOGRAPHIC UNIT CLASSIFICATION A (DENSELY POPULATED REGIONS, DENSE RESIDENTIAL REGIONS) | FLIGHT PROHIBITED | FLIGHT PROHIBITED | CONDITIONALLY PERMITTED |
| GEOGRAPHIC UNIT CLASSIFICATION B (ON ROADS, ON TRAIN LINES) | FLIGHT PROHIBITED | CONDITIONALLY PERMITTED | CONDITIONALLY PERMITTED |
| GEOGRAPHIC UNIT CLASSIFICATION C (URBAN REGIONS) | FLIGHT PROHIBITED | CONDITIONALLY PERMITTED | FLIGHT PERMITTED |
| GEOGRAPHIC UNIT CLASSIFICATION D (AGRICULTURAL FIELDS, RURAL REGIONS) | CONDITIONALLY PERMITTED | FLIGHT PERMITTED | FLIGHT PERMITTED |
| GEOGRAPHIC UNIT CLASSIFICATION E (FREEWAYS, RIVERS, SECURITY-MEASURES-PROVIDED AREAS) | FLIGHT PERMITTED | FLIGHT PERMITTED | FLIGHT PERMITTED |

FIG. 9

| | | PERMISSION CLASSIFICATION | | |
|---|---|---|---|---|
| | | PERMISSION CLASSIFICATION α | PERMISSION CLASSIFICATION β | PERMISSION CLASSIFICATION γ |
| GEOGRAPHIC UNIT CLASSIFICATION | GEOGRAPHIC UNIT CLASSIFICATION A (DENSELY POPULATED REGIONS, DENSE RESIDENTIAL REGIONS) | FLIGHT PROHIBITED | FLIGHT PROHIBITED | CONDITIONALLY PERMITTED |
| | GEOGRAPHIC UNIT CLASSIFICATION B (ON ROADS, ON TRAIN LINES) | FLIGHT PROHIBITED | CONDITIONALLY PERMITTED | CONDITIONALLY PERMITTED |
| | GEOGRAPHIC UNIT CLASSIFICATION C (URBAN REGIONS) | FLIGHT PROHIBITED | CONDITIONALLY PERMITTED | FLIGHT PERMITTED |
| | GEOGRAPHIC UNIT CLASSIFICATION D (AGRICULTURAL FIELDS, RURAL REGIONS) | CONDITIONALLY PERMITTED | FLIGHT PERMITTED | FLIGHT PERMITTED |
| | GEOGRAPHIC UNIT CLASSIFICATION E (FREEWAYS, RIVERS, SECURITY-MEASURES-PROVIDED AREAS) | FLIGHT PERMITTED | FLIGHT PERMITTED | FLIGHT PERMITTED |

MOBILE BODY MANAGEMENT SYSTEM, CONTROL METHOD FOR MOBILE BODY MANAGEMENT SYSTEM, AND MANAGEMENT SERVER FOR MOBILE BODY MANAGEMENT SYSTEM

TECHNICAL FIELD

The present invention relates to a management system for managing movement of a plurality of moving bodies, a control method of this management system, and a management server (a mobile body management system, a control method for the mobile body management system, and a management server for the mobile body management system).

BACKGROUND ART

US Patent Application Publication No. 2015/0339931 discloses a system, method, and apparatus enabling flight response to flight-restricted regions (see the Abstract). In US Patent Application Publication No. 2015/0339931, the position of an unmanned aerial vehicle (UAV) is compared to a flight-restricted region. If necessary, the UAV enacts measures to avoid intruding into a no-fly zone.

SUMMARY OF INVENTION

As described above, in US Patent Application Publication No. 2015/0339931, the position of a UAV is compared to a flight-restricted region, and if necessary, the UAV enacts measures to avoid intruding into a no-fly zone (see the Abstract). These measures can be seen as being taken based on a standard common to each UAV.

However, depending on the purpose of the flight or the like, it is possible to classify the UAVs as UAVs that are permitted to enter into a no-fly zone and UAVs that are not permitted to enter into a no-fly zone. In a case where there is such a classification, it is preferable that nearby people be able to distinguish between these UAVs. However, in US Patent Application Publication No. 2015/0339931, it appears that no investigation is made into such a classification. Such an issue is not limited to UAVs (flying bodies), and also occurs with other autonomous moving bodies (ships, automobiles, and the like) that move autonomously.

The present invention has been devised in order to solve this type of problem, and has the object of providing a moving body management system, a control method of this management system, and a management server making it possible for nearby people to easily distinguish between autonomous flying bodies that are permitted to enter into entry-limited regions and autonomous flying bodies that are not permitted to enter into entry-limited regions.

A management system according to one aspect of the present invention is a management system including a movement managing section that communicates with a plurality of moving bodies via a communication apparatus and manages movement of the plurality of moving bodies, the moving bodies including an autonomous moving body that includes an autonomous control section for autonomous movement, wherein the autonomous moving body includes a display apparatus configured to perform display directed outward, the movement managing section includes a priority/subordination determining section configured to determine priority/subordination degrees concerning movement of the plurality of moving bodies, based on individual information of the plurality of moving bodies, and the autonomous moving body includes a display control section configured to control the display of the display apparatus according to the priority/subordination degree determined by the priority/subordination determining section.

According to the present invention, the display of the first display apparatus of the autonomous moving body is controlled according to the priority/subordination degree. In this way, people around the autonomous moving body can easily identify whether the autonomous moving body is permitted to enter into an entry-limited region by checking the priority/subordination degree of the autonomous moving body using the display of the first display apparatus. Accordingly, the people around the autonomous moving body can easily understand the movement state of the autonomous moving body. Accordingly, it is possible to have a sense of security if the autonomous moving body is moving correctly, for example.

The management system may include a map information database in which map information is accumulated; a moving body database in which the individual information of the plurality of moving bodies is accumulated; and a position detecting unit configured to detect a current location of the autonomous moving body, wherein the map information database may include unit classification information, which is attribute information of each geographic unit classification, as the map information, and the display control section may be configured to control the display of the display apparatus based on the priority/subordination degree and the unit classification corresponding to the current location of the autonomous moving body. In this way, the display of the first display apparatus of the autonomous moving body is controlled according to, in addition to the priority/subordination degree, the unit classification corresponding to the current location of the autonomous moving body. Accordingly, it is possible to perform display that takes into consideration both the geographic unit classification and the priority/subordination degree, such as performing display corresponding to the priority/subordination degree only when the unit classification requires the display of the first display apparatus or the like.

The management system may include another display apparatus fixed to the ground and configured to perform display directed outward; and another display control section configured to control the display of the other display apparatus, wherein the other display control section may control the display of the other display apparatus according to the priority/subordination degree of the autonomous moving body, when the autonomous moving body passes through a vicinity of the other display apparatus. In this way, when the autonomous moving body passes through the vicinity of the other display apparatus, the people around the other display apparatus can learn the priority/subordination degree of the autonomous moving body.

The management system may include a portable terminal that includes a user interface section configured to perform display or audio output; and an output control section configured to control the display or audio output of the user interface section, wherein the output control section may control the display or audio output of the user interface section according to the priority/subordination degree of the autonomous moving body, when the autonomous moving body passes through a vicinity of the portable terminal. In this way, when the autonomous moving body passes through the vicinity of the portable terminal, the user of the portable terminal can learn the priority/subordination degree of the autonomous moving body.

The user interface section may be configured to perform display, and the output control section may cause the user interface section to display information concerning the priority/subordination degree and movement state information indicating a movement state of the autonomous moving body, when the autonomous moving body passes through the vicinity of the portable terminal. In this way, when the autonomous moving body passes through the vicinity of the portable terminal, the user of the portable terminal can learn the priority/subordination degree and the movement state (e.g., the movement velocity, ground altitude, and the like) of the autonomous moving body.

A management system according to another aspect of the present invention is a management system including a movement managing section that communicates with a plurality of moving bodies via a communication apparatus and manages movement of the plurality of moving bodies, the moving bodies including an autonomous moving body that includes an autonomous control section for autonomous movement, the management system including a display apparatus provided outside the autonomous moving body; and a display control section configured to control display of the display apparatus, wherein the movement managing section includes a priority/subordination determining section configured to determine priority/subordination degrees concerning movement of the plurality of moving bodies, based on individual information of the plurality of moving bodies, and the display control section controls the display of the display apparatus according to the priority/subordination degree of the autonomous moving body, when the autonomous moving body is near the display apparatus.

According to the present embodiment, when the autonomous moving body is near the display apparatus, the display of the display apparatus is controlled according to the priority/subordination degree of the autonomous moving body. In this way, the people near the display apparatus can easily identify whether the autonomous moving body is permitted to enter into an entry-limited region by checking the priority/subordination degree of the autonomous moving body using the display of the display apparatus.

Accordingly, the people around the autonomous moving body can easily understand the movement state of the autonomous moving body. Accordingly, it is possible to have a sense of security if the autonomous moving body is moving correctly, for example.

The individual information may include machine information determined based on use application of the moving body.

The machine information may include a machine classification, and the use application of a moving body associated with a first machine classification among a plurality of the machine classifications may have a more public nature than the use application of a moving body associated with a second machine classification among the plurality of machine classifications.

The first machine classification may be divided into at least an emergency machine classification and a general machine classification, and the use application of a moving body associated with the emergency machine classification may have a higher degree of urgency than the use application of a moving body associated with the general machine classification.

The second machine classification may be divided into at least a commercial machine classification and a non-commercial machine classification, a moving body associated with the commercial machine classification may be used for commercial purposes, and a moving body associated with the non-commercial machine classification may be used for non-commercial purposes.

The priority/subordination determining section may be configured to determine the priority/subordination degree of a moving body for which the machine information indicates the first machine classification to be higher than the priority/subordination degree of a moving body for which the machine information indicates the second machine classification.

The individual information may include geographic information determined based on a geographic unit classification into which the moving body is permitted to enter.

The individual information may include passenger information determined based on presence or absence of a passenger in the moving body.

The priority/subordination determining section may be configured to determine the priority/subordination degree of a moving body for which the passenger information indicates that there is a passenger, to be higher than the priority/subordination degree of a moving body for which the passenger information indicates that there is no passenger.

The individual information may include loaded object information determined based on a value of a loaded object in the moving body.

The priority/subordination determining section may be configured to determine the priority/subordination degree of a moving body for which the loaded object information indicates a first value to be higher than the priority/subordination degree of a moving body for which the loaded object information indicates a second value that is less than the first value.

The individual information may include state information indicating a state of the moving body.

The state information may be movement velocity information indicating a movement velocity of the moving body, and the priority/subordination determining section may be configured to determine the priority/subordination degree of a moving body for which the movement velocity information indicates a first movement velocity to be lower than the priority/subordination degree of a moving body for which the movement velocity information indicates a second movement velocity that is less than the first movement velocity.

The state information may be movement altitude information indicating a movement altitude of the moving body, and the priority/subordination determining section may be configured to determine the priority/subordination degree of a moving body for which the movement altitude information indicates a first movement altitude to be lower than the priority/subordination degree of a moving body for which the movement altitude information indicates a second movement altitude that is less than the first movement altitude.

The state information may be remaining capacity information indicating a remaining capacity of a propulsion energy source of the moving body, and the priority/subordination determining section may be configured to determine the priority/subordination degree of a moving body for which the remaining capacity information indicates a first remaining capacity to be lower than the priority/subordination degree of a moving body for which the remaining capacity information indicates a second remaining capacity that is less than the first remaining capacity.

The state information may be movable distance information indicating a movable distance using a propulsion energy source of the moving body, and the priority/subordination determining section may be configured to determine the priority/subordination degree of a moving body for which the movable distance information indicates a first movable distance to be lower than the priority/subordination degree of a moving body for which the movable distance information indicates a second movable distance that is shorter than the first movable distance.

The individual information may include capability information determined based on a capability of the moving body.

The capability information may be maximum velocity information determined based on a maximum velocity of the moving body, and the priority/subordination determining section may be configured to determine the priority/subordination degree of a moving body for which the maximum velocity information indicates a first maximum velocity to be lower than the priority/subordination degree of a moving body for which the maximum velocity information indicates a second maximum velocity that is less than the first maximum velocity.

The maximum velocity may be a maximum velocity in a vertical direction.

The capability information may be maximum output information determined based on a maximum output of a propulsion apparatus included in the moving body, and the priority/subordination determining section may be configured to determine the priority/subordination degree of a moving body for which the maximum output information indicates a first maximum output to be lower than the priority/subordination degree of a moving body for which the maximum output information indicates a second maximum output that is less than the first maximum output.

The moving body may further include a priority/subordination changing section configured to change the priority/subordination degree determined by the priority/subordination determining section.

The priority/subordination changing section is configured to change the priority/subordination degree based on presence or absence of a passenger in the autonomous moving body.

The priority/subordination changing section may be configured to change the priority/subordination degree based on a movement velocity of the autonomous moving body.

The priority/subordination changing section may be configured to change the priority/subordination degree based on a movement altitude of the autonomous moving body.

The priority/subordination changing section may be configured to change the priority/subordination degree based on a remaining capacity of a propulsion energy source of the autonomous moving body.

The priority/subordination changing section may be configured to change the priority/subordination degree based on a movable distance using a propulsion energy source of the autonomous moving body.

A management system control method according to yet another aspect of the present invention is a control method for a management system including a movement managing section that communicates with a plurality of moving bodies via a communication apparatus and manages movement of the plurality of moving bodies, the moving bodies including an autonomous moving body that includes an autonomous control section for autonomous movement, wherein the autonomous moving body includes a display apparatus configured to perform display directed outward, the movement managing section is configured to determine priority/subordination degrees concerning movement of the plurality of moving bodies, based on individual information of the plurality of moving bodies, and a display control section included in the autonomous moving body is configured to control the display of the display apparatus according to the priority/subordination degree.

A management server according to yet another aspect of the present invention is a management server that communicates with a plurality of moving bodies and manages movement of the plurality of moving bodies, the moving bodies including an autonomous moving body that includes an autonomous control section for autonomous movement, the management server including a priority/subordination determining section configured to determine priority/subordination degrees concerning movement of the plurality of moving bodies, based on individual information of the plurality of moving bodies, and a display control section configured to control the display of a display apparatus of the moving autonomous body that performs display directed outward, according to the priority/subordination degree.

A management server according to yet another aspect of the present invention is a management system including a movement managing section that communicates with a plurality of moving bodies via a communication apparatus and manages movement of the plurality of moving bodies, the moving bodies including an autonomous moving body that includes an autonomous control section for autonomous movement, wherein the autonomous moving body includes a display apparatus configured to perform display directed outward, the movement managing section includes a permission determining section configured to determine a geographic region in which the autonomous moving body is permitted to move, and the autonomous moving body includes a display control section configured to control the display of the display apparatus according to the geographic region determined by the permission determining section.

The movement managing section may further include a setting section configured to set the geographic region to have a geographic unit classification according to a geographic attribute.

The movement managing section may further include a classification determining section configured to determine the geographic unit classification in which the autonomous body is permitted to move.

The permission determining section may be configured to determine the geographic region in which the autonomous moving body is permitted to move based on the geographic unit classification determined by the classification determining section.

The display control section may be configured to control the display of the display apparatus according to the geographic unit classification determined by the classification determining section.

According to the present invention, it is possible for nearby people to easily distinguish between autonomous flying bodies that are permitted to enter into entry-limited regions and autonomous flying bodies that are not permitted to enter into entry-limited regions.

BRIEF DESCRIPTION OF DRAWINGS

FIG. 3 shows an example of a relationship between machine classifications and classifications of geographic units into which entry is permitted;

FIG. 9 shows an example of a relationship between machine classifications and classifications of geographic units into which entry is permitted.

DESCRIPTION OF EMBODIMENTS

A. Embodiment

A-1. Configuration

[A-1-1. Overall Configuration]

Figure 1:
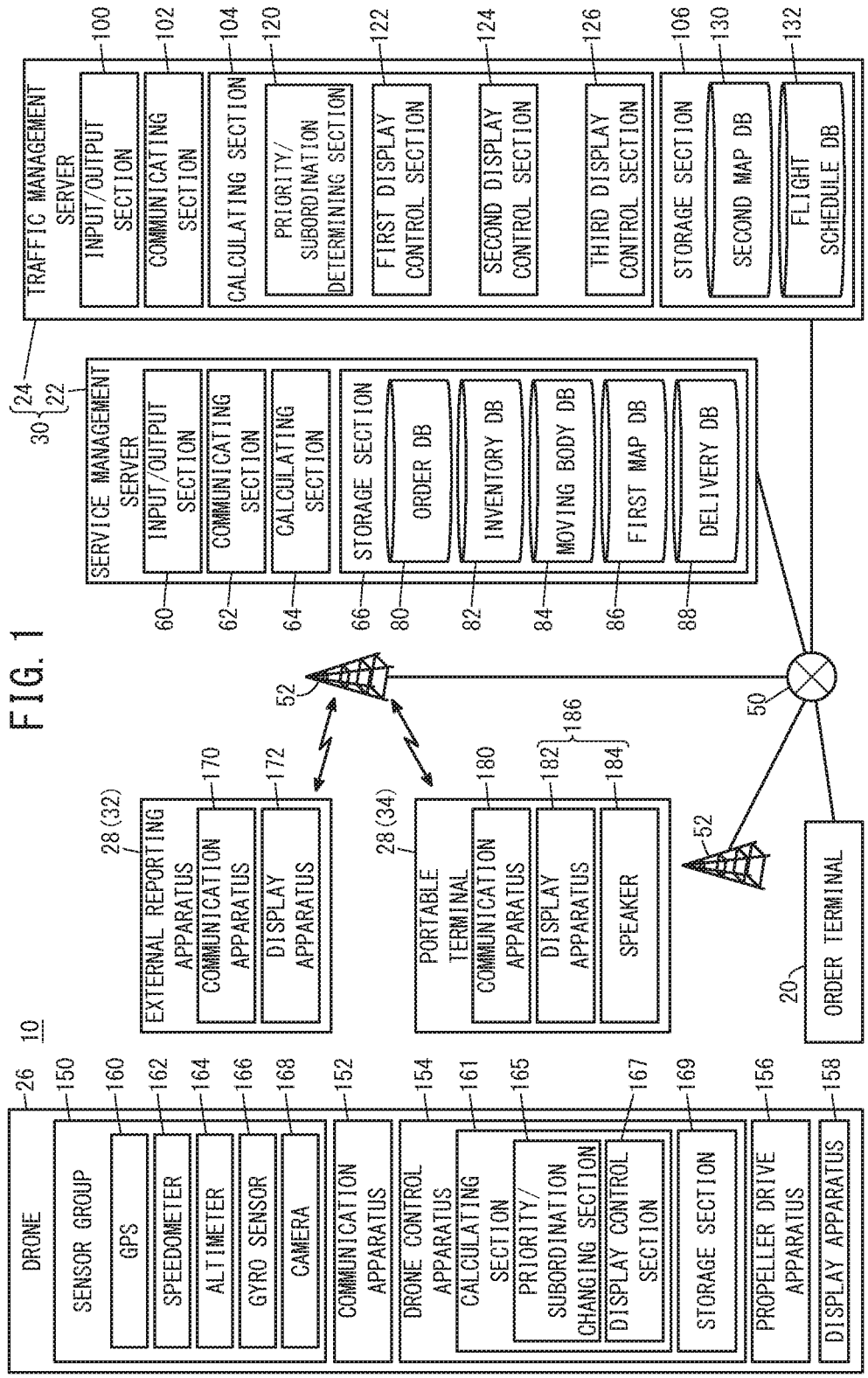
FIG. 1 shows an overall configuration of an outline of a management system according to an embodiment of the present invention.

FIG. 1 shows an overall configuration of an outline of a management system 10 according to an embodiment of the present invention. The management system 10 includes a plurality of order terminals 20, at least one service management server 22 (also referred to below as a "service server 22"), at least one traffic management server 24 (also referred to below as a "traffic server 24"), a plurality of drones (autonomous moving bodies or moving bodies) 26, and a plurality of peripheral devices 28. The service server 22 and the traffic server 24 form a movement managing section 30 that manages movement of the plurality of drones 26. The movement managing section 30 communicates with the plurality of drones 26 via communicating sections (communication apparatuses) 62 and 102, and manages the movement of the plurality of drones 26. The peripheral device 28 includes an external reporting apparatus 32 and a portable terminal 34.

FIG. 1 shows only one each of the order terminal 20, the service server 22, the traffic server 24, the drone 26, the external reporting apparatus 32, and the portable terminal 34. In the management system 10, the drone 26 (also referred to below as a "delivery drone 26del") delivers a product G based on order information Iodr for the product G input via the order terminal 20. Furthermore, in the management system 10, while the delivery drone 26del is flying, display is performed (details of this are described further below) by the delivery drone 26del, the external reporting apparatus 32, and the portable terminal 34 based on a priority/subordination degree (movement priority rank, priority rank, or priority degree) R.

Communication is possible between the order terminal 20 and the service server 22 and between the service server 22 and the traffic server 24, via Internet 50. Furthermore, communication is possible between the service server 22 and the drone 26, between the traffic server 24 and the external reporting apparatus 32, and between the traffic server 24 and the portable terminal 34, via the Internet 50 and a wireless relay station 52.

[A-1-2. Order Terminal 20]

The order terminal 20 is an external terminal that handles orders from customers for a product G handled by the service server 22. The order terminal 20 is formed from a personal computer or a smartphone, for example.

[A-1-3. Service Management Server 22]

The service management server 22 is a server managed by a prescribed company, and performs order reception management, inventory management, and delivery management for the company. The order reception management includes receiving orders (service requests) from the order terminal 20. The inventory management includes managing the inventory of the product G. The delivery management includes managing the delivery of the product G (movement of a plurality of drones 26).

As shown in FIG. 1, the service server 22 includes an input/output section 60, the communicating section 62, a calculating section 64, and a storage section 66. The communicating section 62 is capable of communicating with the order terminal 20, the traffic server 24, and the like via the Internet 50.

The calculating section 64 includes a central processing unit (CPU) and operates by executing a program stored in the storage section 66. Some of the functions executed by the calculating section 64 can be realized using a logic IC (Integrated Circuit). The calculating section 64 can form a portion of this program with hardware (circuit components). The calculating section 64 manages the delivery of the product G, and also manages the flight of the delivery drone 26del.

The storage section 66 stores programs and data used by the calculating section 64, and includes a random access memory (referred to below as a "RAM"). A volatile memory such as a register and a nonvolatile memory such as a hard disk or a flash memory can be used as the RAM. Furthermore, the storage section 66 may include a read only memory (ROM) in addition to the RAM.

The storage section 66 includes an order database 80 (referred to below as an "order DB 80"), an inventory database 82 (referred to below as an "inventory DB 82"), a moving body database 84 (referred to below as a "moving body DB 84"), a first map database 86 (referred to below as a "first map DB 86"), and a delivery database 88 (referred to below as a "delivery DB 88").

The order DB 80 accumulates information (order information Iodr) concerning orders received via each order terminal 20. The inventory DB 82 accumulates information (inventory information Istk) concerning the inventory. The moving body DB 84 accumulates individual information Ii concerning a drone 26 to be used for the delivery.

Furthermore, the individual information Ii includes identification information (identification ID) of the drone 26 and information concerning an attribute of the drone 26, for example. The information concerning the attribute includes the type (small-scale, large-scale, or the like), the maximum loading amount, the maximum dimensions of a package that can be loaded, a capability, application, and purpose of use. Furthermore, the individual information Ii may include one or more of the number of packages that can be loaded, the maximum number of people the drone 26 can be used by, the fuel consumption, the maximum velocity, the number of years of operation, the total distance travelled, and the current location Pdcur of the drone 26.

The first map DB 86 accumulates map information (first map information Imap1) for performing delivery with the drone 26. The first map information Imap1 includes position information of an entry-limited region into which permission for entry from the traffic server 24 is requested.

The delivery DB 88 accumulates information (delivery information Idel) concerning the delivery of a product G for which an order has been received. The delivery information Idel also includes information concerning the delivery drone 26del to perform the delivery of the product G, for example.

[A-1-4. Traffic Management Server 24]

The traffic management server 24 is a server managed by a public institution, and manages information (traffic information It) concerning flight (movement) of a plurality of moving bodies (the delivery drone 26del and the like). As an example, when a flight permission request for a drone 26 is received from the service server 22, the traffic server 24 judges whether to grant this flight permission request, and notifies the service server 22 about granting or denial of permission according to the judgment result. Furthermore, the traffic server 24 provides the service server 22 with various types of information (e.g., traffic congestion information) concerning the drones 26.

As shown in FIG. 1, the traffic server 24 includes an input/output section 100, the communicating section 102, a calculating section 104, and a storage section 106. The communicating section 102 is capable of communicating with the service server 22, the drone 26, the external reporting apparatus 32, the portable terminal 34, and the like via the Internet 50.

The calculating section 104 includes a CPU and operates by executing a program stored in the storage section 106. Some of the functions executed by the calculating section 104 can be realized using a logic IC. The calculating section 104 can form a portion of this program with hardware (circuit components).

As shown in FIG. 1, the calculating section 104 includes a priority/subordination determining section (rank issuing section) 120, a first display control section 122, a second display control section 124, and a third display control section 126. The priority/subordination determining section 120 issues a priority/subordination degree R of a drone 26 based on the individual information Ii concerning the attributes of this drone 26. In other words, the priority/subordination determining section 120 can determine a priority/subordination degree R concerning the movement of each of the plurality pf drones 26, based on the individual information Ii of the drones 26. The priority/subordination degree R is an index (identification key) indicating a degree of priority concerning movement of a flying body such as a drone 26. The individual information Ii is provided from the service server 22 in the flight permission request. The priority/subordination determining section 120 can be realized by having the calculating section 104 execute the program stored in the storage section 106. FIG. 1 shows a case in which the priority/subordination determining section 120 is included in the traffic management server 24, but the present invention is not limited to this.

The individual information can include machine information determined based on use application of the plurality of drones 26. For example, the machine information can include a machine classification (classification). FIG. 3 shows an example of a relationship between machine classifications and classifications Su of geographic units into which entry is permitted.

As shown in FIG. 3, there can be a first type, a second type, and a third type of machine classification, for example, as the machine classification, but the present invention is not limited to this. There can be a geographic unit classification A, a geographic unit classification B, a geographic unit classification C, a geographic unit classification D, and a geographic unit classification E as the geographic unit classifications Su, but the present invention is not limited to this. The geographic unit classification A is for highly populated regions and dense residential regions, for example. The geographic unit classification B is for roads and train lines, for example. The geographic unit classification C is for urban regions, for example. The geographic unit classification D is for agricultural fields and rural regions, for example. The geographic unit classification E is for freeways, rivers, and security-measures-provided areas.

As shown in FIG. 3, the first type of machine is prohibited from entering into regions with the geographic unit classifications A to C, for example. Furthermore, the first type of machine is conditionally permitted to enter into regions with the geographic unit classification D, for example. Yet further, the first type of machine is unconditionally permitted to enter into regions with the geographic unit classification E. The first type of machine can correspond to a machine for private use, for example. A machine used for commercial delivery, non-commercial delivery, commercial photography, non-commercial photography, and the like, for example, can correspond to the first type of machine.

The second type of machine is prohibited from entering into regions with the geographic unit classification A, for example. Furthermore, the second type of machine is conditionally permitted to enter into regions with the geographic unit classifications B and C, for example. Yet further, the second type of machine is unconditionally permitted to enter into regions with the geographic unit classifications D and E. The second type of machine can correspond to a machine for general public use, for example. A machine used for patrol surveillance by police and the like, for example, can correspond to the second type of machine.

The third type of machine is conditionally permitted to enter into regions with the geographic unit classifications A and B, for example. Furthermore, the third type of machine is unconditionally permitted to enter into regions with the geographic unit classifications C to E. The third type of machine can correspond to a machine for emergency public use, for example. A machine used for disaster response, lifesaving operations, crime response, and the like, for example, can correspond to the third type of machine.

The second type corresponds to a normal machine classification, for example, and the third type corresponds to an emergency machine classification, for example. The use application of a drone 26 associated with the third type, i.e., with the emergency machine classification, has a higher degree of urgency than the use application of a drone 26 associated with the second type, i.e., with the general machine classification.

The second type and third type are associated with a first machine classification, for example. The first type is associated with a second machine classification, for example. The use application of a drone 26 associated with the first machine classification is of a more public nature than the use application of a drone 26 associated with the second machine classification.

The second machine classification can be divided into at least a commercial machine classification (not shown in the drawings) and a non-commercial machine classification (not shown in the drawings). A drone 26 associated with the commercial machine classification can be used for commercial purposes. A drone 26 associated with the non-commercial machine classification can be used for non-commercial purposes.

The priority/subordination determining section 120 can determine, for a drone 26 for which the machine information concerning the machine classification indicates the first machine classification, a priority/subordination degree R that is higher than the priority/subordination degree R determined for a drone 26 for which the machine information concerning the machine classification indicates the second machine classification.

Here, a "high priority/subordination degree" means that the corresponding machine has priority over and is not subordinate to a machine with a relatively lower priority/subordination degree R. In other words, having a "high priority/subordination degree" means having a high degree of priority, i.e., a low degree of subordination. Furthermore, a "low priority/subordination degree" means that the corresponding machine is subordinate to and not prioritized over a machine with a relatively higher priority/subordination degree R. In other words, having a "low priority/subordination degree" means having a low degree of priority, i.e., a high degree of subordination.

The individual information can include geographic information based on the geographic unit classification Su of regions into which the drone 26 is permitted to enter, for example. Examples of the geographic unit classifications Su include the geographic unit classifications A to E such as described above using FIG. 3, but the present invention is not limited to this.

The individual information can include passenger information determined based on the presence or absence of a passenger in the drone 26, for example. The priority/subordination determining section 120 can determine, for a drone 26 for which the passenger information indicates that there is a passenger, a priority/subordination degree R that is higher than the priority/subordination degree R of a drone 26 for which the passenger information indicates that there is no passenger.

The individual information can include loaded object information determined based on the value of an object loaded in the drone 26, for example. The priority/subordination determining section 120 can determine, for a drone 26 for which the loaded object information indicates a first value, a priority/subordination degree R that is higher than the priority/subordination degree R of a drone 26 for which the loaded object information indicates a second value that is lower than the first value.

The individual information can include state information indicating a state of the drone 26, for example.

The state information is movement velocity information indicating movement velocity of the drone 26, for example. The priority/subordination determining section 120 can determine, for a drone 26 for which the movement velocity information indicates a first movement velocity, a priority/subordination degree R that is lower than the priority/subordination degree R of a drone 26 for which the movement velocity information indicates a second movement velocity that is lower than the first movement velocity.

The state information is movement altitude information indicating movement altitude of the drone 26, for example. The priority/subordination determining section 120 can determine, for a drone 26 for which the movement altitude information indicates a first movement altitude, a priority/subordination degree R that is lower than the priority/subordination degree R of a drone 26 for which the movement altitude information indicates a second movement altitude that is lower than the first movement altitude.

The state information is remaining capacity information indicating the remaining capacity of a propulsion energy source of the drone 26, for example. The priority/subordination determining section 120 can determine, for a drone 26 for which the remaining capacity information indicates a first remaining capacity, a priority/subordination degree R that is lower than the priority/subordination degree R of a drone 26 for which the remaining capacity information indicates a second remaining capacity that is lower than the first remaining capacity.

The state information is movable distance information indicating a movable distance that the drone 26 can move using the propulsion energy source, for example. The priority/subordination determining section 120 can determine, for a drone 26 for which the movable distance information indicates a first moveable distance, a priority/subordination degree R that is lower than the priority/subordination degree R of a drone 26 for which the moveable distance information indicates a second moveable distance that is shorter than the first moveable distance.

The individual information can include capability information determined based on the capability of the drone 26, for example.

The capability information is maximum velocity information indicating a maximum velocity of the drone 26, for example. The priority/subordination determining section 120 can determine, for a drone 26 for which the maximum velocity information indicates a first maximum velocity, a priority/subordination degree R that is lower than the priority/subordination degree R of a drone 26 for which the maximum velocity information indicates a second maximum velocity that is less than the first maximum velocity. This maximum velocity is the maximum velocity in a vertical direction, for example.

The capability information is maximum output information indicating the maximum output of a propeller drive section (propulsion apparatus) 108 included in the drone 26, for example. The priority/subordination determining section 120 can determine, for a drone 26 for which the maximum output information indicates a first maximum output, a priority/subordination degree R that is lower than the priority/subordination degree R of a drone 26 for which the maximum output information indicates a second maximum output that is lower than the first maximum output.

The first display control section 122 performs first display control for controlling the display of the drone 26 (drone display apparatus 158 described further below) according to the priority/subordination degree R. The first display control section 122 controls the display of the drone 26 via a display control section 167 included in the drone 26, based on the priority/subordination degree R and the geographic unit classification Su corresponding to the current location Pdcur of the drone 26.

The second display control section 124 (display control section) performs second display control (display control) for controlling the display of the external reporting apparatus 32 (an external display apparatus 172 described further below). The second display control section 124 controls the display of the external reporting apparatus 32 according to the priority/subordination degree R of the drone 26, when the drone 26 (delivery drone 26del) passes through a region in the vicinity of the external reporting apparatus 32.

The third display control section 126 (output control section or display control section) performs output control (display control) for controlling the display or audio output of the portable terminal 34 (a user interface section 186 described further below). The third display control section 126 controls the display or audio output of the portable terminal 34 according to the priority/subordination degree R of the drone 26, when the drone 26 (delivery drone 26del) passes through a region in the vicinity of the portable terminal 34. The third display control section 126 causes the portable terminal 34 to display movement state information indicating a movement state of the drone 26 and information concerning the priority/subordination degree R, when the drone 26 passes through a region in the vicinity of the portable terminal 34.

The storage section 106 stores programs and data used by the calculating section 104, and includes a RAM.

Furthermore, the storage section 106 may include a ROM in addition to the RAM. The storage section 106 includes a second map database 130 (referred to below as a "second map DB 130") and a flight schedule database 132 (referred to below as a "flight schedule DB 132").

The second map DB 130 accumulates map information (second map information Imap2) concerning the traffic (flight) of a plurality of moving bodies (drones 26 or the like). The second map information Imap2 includes unit classification information Isu that is information concerning the geographic unit classification Su. The flight schedule DB 132 accumulates information (flight schedule information Isc) concerning the flight schedule of each moving body.

[A-1-5. Drone 26]

(A-1-5-1. Outline of the Drone 26)

The drone 26 (autonomous moving body) of the present embodiment is used for product delivery, and delivers a product G from a departure location Pst (warehouse or the like) to a delivery destination Pdtar, according to a delivery command (flight command) received from the service server 22 via the Internet 50 and the wireless relay station 52. As described further below, the drone 26 may be used for other purposes.

As shown in FIG. 1, the drone 26 includes a drone sensor group 150, a communication apparatus 152, a drone control apparatus 154, a propeller drive apparatus 156, and the drone display apparatus 158.

(A-1-5-2. Drone Sensor Group 150)

The drone sensor group 150 includes a global positioning system sensor 160 (referred to below as a "GPS sensor 160"), a speedometer 162, an altimeter 164, a gyro sensor 166, and a camera 168.

The GPS sensor 160 (position detecting unit) detects the current location Pdcur of the drone 26. The speedometer 162 detects the flight velocity Vd [km/h] of the drone 26. The altimeter 164 detects the ground altitude H (also referred to below as the "altitude H") [m] of the drone 26, which is the distance from the drone 26 to the surface of the ground therebelow. The gyro sensor 166 detects the angular velocity co [rad/sec] of the drone 26. The angular velocity co includes the angular velocity Y relative to the up-down axis (yaw Y), the angular velocity P relative to the left-right axis (pitch P), and the angular velocity Ro relative to the front-rear axis (roll Ro).

The camera 168 is arranged in a bottom portion of the body of the drone 26, and acquires an image Id of the drone 26 (also referred to below as a "drone image Id"). The camera 168 is a video camera that captures a moving image. Alternatively, the camera 168 may be capable of capturing both moving images and still images, or may be capable of capturing only still images. The orientation of the camera 168 (posture of the camera 168 relative to the body of the drone 26) can be adjusted by a camera actuator (not shown in the drawings). Alternatively, the position of the camera 168 relative to the body of the drone 26 may be fixed.

(A-1-5-3. Communication Apparatus 152)

The communication apparatus 152 is capable of performing radio communication with the wireless relay station 52 and the like, and includes a radio communication module, for example. The communication apparatus 152 is capable of communicating with the service server 22, the traffic server 24, and the like via the wireless relay station 52 and the Internet 50.

(A-1-5-4. Drone Control Apparatus 154)

The drone control apparatus 154 (autonomous control section) performs overall control of the drone 26, such as by controlling the flight, image capturing, and the like of the drone 26. The drone control apparatus 154 can cause the drone 26 to move autonomously. The drone control apparatus 154 causes the drone 26 to move (fly) autonomously from the departure location Pst to the destination Ptar. The drone control apparatus 154 includes an input/output section (not shown in the drawings), a calculating section, and a storage section. The drone control apparatus 154 (calculating section thereof) performs drone-side display control for performing display in the drone display apparatus 158 based on the priority/subordination degree R.

The drone control apparatus 154 includes a calculating section 161 and a storage section 169. The calculating section 161 can include a central processing unit, an FPGA, and the like. The calculating section 161 operates by executing a program stored in the storage section 169. Some of the functions executed by the calculating section 161 can be realized using a logic IC. The calculating section 161 can form a portion of the program such a described above with hardware (circuit components). As shown in FIG. 1, the calculating section 161 includes a priority/subordination changing section 165 and the display control section 167. The priority/subordination changing section 165 and the display control section 167 can be realized by executing the program stored in the storage section 169 with the calculating section 161.

The priority/subordination changing section 165 can change the priority/subordination degree R determined by the priority/subordination determining section 120, in the manner described below.

The priority/subordination changing section 165 can change the priority/subordination degree R based on the presence or absence of a passenger in the drone 26. For example, if passenger information of the drone 26 indicates that there is a passenger, the priority/subordination changing section 165 may increase the priority/subordination degree R of this drone 26 by a prescribed amount. As another example, if the passenger information of the drone 26 indicates that there is no passenger, the priority/subordination changing section 165 may decrease the priority/subordination degree R of this drone 26 by a prescribed amount.

The priority/subordination changing section 165 can change the priority/subordination degree R based on a movement velocity of the drone 26. For example, if the movement velocity of the drone 26 is greater than or equal to a threshold value, the priority/subordination changing section 165 may decrease the priority/subordination degree R of this drone 26 by a prescribed amount. As another example, if the movement velocity of the drone 26 is less than the threshold value, the priority/subordination changing section 165 may increase the priority/subordination degree R of this drone 26 by a prescribed amount.

The priority/subordination changing section 165 can change the priority/subordination degree R based on a movement altitude of the drone 26. For example, if the movement altitude of the drone 26 is greater than or equal to a threshold value, the priority/subordination changing section 165 may decrease the priority/subordination degree R of this drone 26 by a prescribed amount. As another example, if the movement altitude of the drone 26 is less than the threshold value, the priority/subordination changing section 165 may increase the priority/subordination degree R of this drone 26 by a prescribed amount.

The priority/subordination changing section 165 can change the priority/subordination degree R based on a remaining capacity of a propulsion energy source of the drone 26. For example, if the remaining capacity of the drone 26 is greater than or equal to a threshold value, the priority/subordination changing section 165 may decrease the priority/subordination degree R of this drone 26 by a prescribed amount. As another example, if the remaining capacity of the drone 26 is less than the threshold value, the priority/subordination changing section 165 may increase the priority/subordination degree R of this drone 26 by a prescribed amount.

The priority/subordination changing section 165 can change the priority/subordination degree R based on a movable distance using the propulsion energy source of the drone 26. For example, if the movable distance of the drone 26 is greater than or equal to a threshold value, the priority/subordination changing section 165 may decrease the priority/subordination degree R of this drone 26 by a prescribed amount. As another example, if the movable distance of the drone 26 is less than the threshold value, the priority/subordination changing section 165 may increase the priority/subordination degree R of this drone 26 by a prescribed amount.

The display control section 167 controls the display of the drone display apparatus 158 according to the priority/subordination degree R determined by the priority/subordination determining section 120. More specifically, the display control section 167 controls the display of the drone display apparatus 158 according to a signal from the first display control section 122.

The storage section 169 stores programs, data, and the like used by the calculating section 161. The storage section 169 can include a volatile memory (not shown in the drawings) and a nonvolatile memory (not shown in the drawings). The volatile memory can be a RAM, for example. The volatile memory can be used as a register, for example. The nonvolatile memory can be a ROM, a flash memory, a hard disk drive, or the like, for example.

(A-1-5-5. Propeller Drive Apparatus 156)

The propeller drive apparatus 156 includes a plurality of propellers and a plurality of propeller actuators. The propeller actuators include electric motors, for example.

(A-1-5-6. Drone Display Apparatus 158)

The drone display apparatus (display apparatus) 158 performs display directed outward (particularly downward) from the drone 26. The drone display apparatus 158 is formed by a light emitting body such as a lamp or display panel arranged in a bottom portion of the body of the drone 26, for example. A liquid crystal panel, an organic electroluminescent (EL) panel, or the like can be used as the display panel. The drone display apparatus 158 emits light due to a signal from the display control section 167 included in the drone control apparatus 154.

[A-1-6. Peripheral Device 28]

(A-1-6-1. External Reporting Apparatus 32)

The external reporting apparatus 32 provides a prescribed notification to each nearby person, based on a command signal from the movement managing section 30 (here, the traffic server 24). The external reporting apparatus 32 includes a communication apparatus 170 and the external display apparatus 172. The communication apparatus 170 is capable of communicating with the traffic server 24 and the like via the wireless relay station 52 and the Internet 50. The external display apparatus 172 is fixed to the ground and performs display directed outward. The external display apparatus 172 includes a display panel installed near a road, for example.

(A-1-6-2. Portable Terminal 34)

The portable terminal 34 is an external device that provides a user of the portable terminal 34 with information (the priority/subordination degree R and the flight information If) concerning the flight of the drone 26. The portable terminal 34 includes a communication apparatus 180, a portable display apparatus 182, and a speaker 184. The portable display apparatus 182 and the speaker 184 form the user interface section 186. The portable terminal 34 includes a smartphone possessed by each individual person, for example. The communication apparatus 180 is capable of communicating with the traffic server 24 and the like via the wireless relay station 52 and the Internet 50.

A-2. Control of the Present Embodiment

[A-2-1. During Order and Delivery (Flight Permission Request)]

(A-2-1-1. Outline of the Flow during Order and Delivery)

Figure 2:
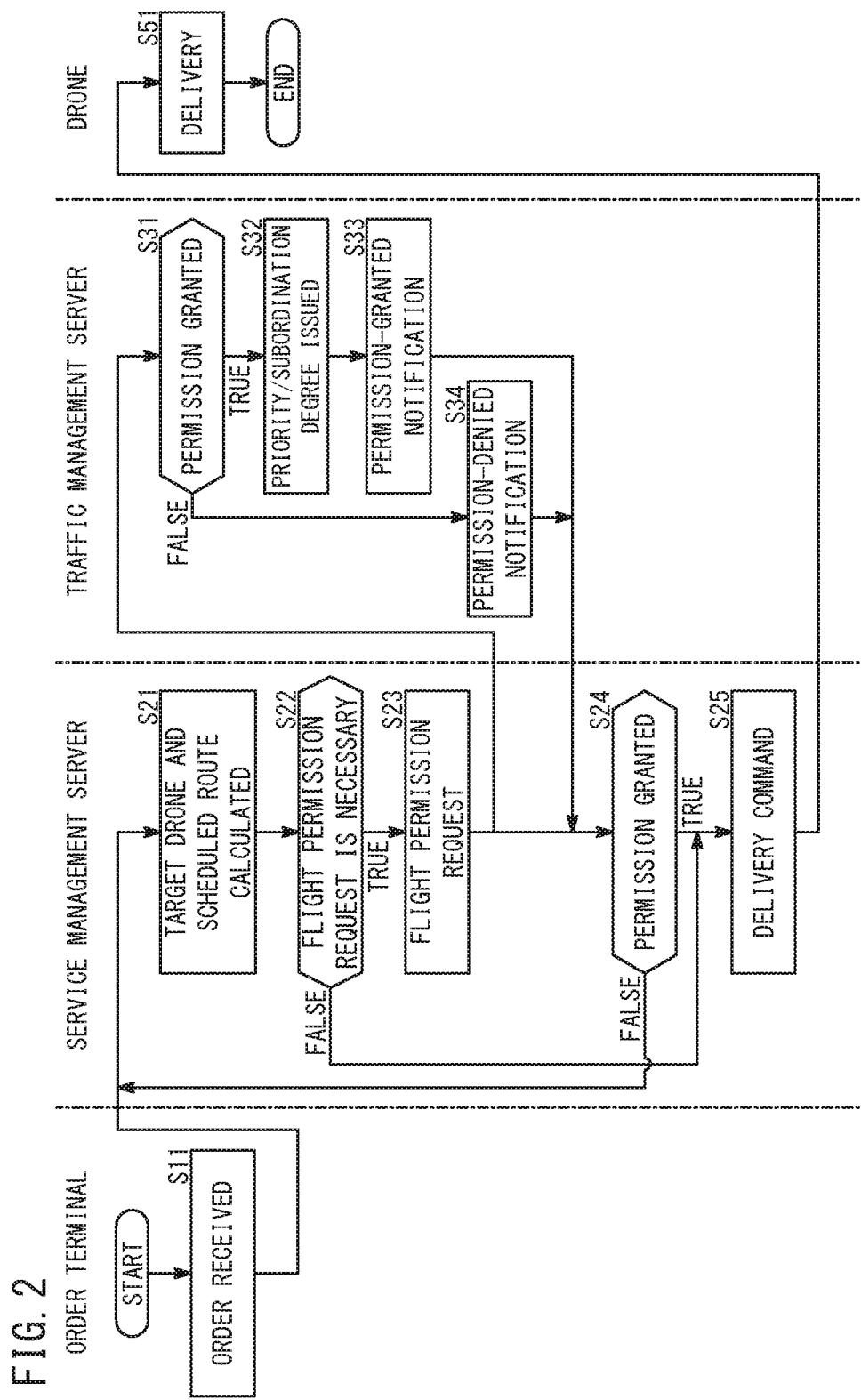
FIG. 2 is a flow chart showing the outline occurring when a product ordered by a customer is delivered by a drone, in an embodiment of the present invention.

FIG. 2 is a flow chart showing the outline occurring when a product G ordered by a customer is delivered by a drone 26. In the following, to facilitate understanding of the present invention, a screen for the delivery of the product G is used as an example. As described further below, the present invention can be applied in various ways and is not limited to the delivery of a product G.

At step S11, the order terminal 20 receives an order according to a manipulation made by a customer. Specifically, the order terminal 20 displays an order screen in a display section (not shown in the drawings), according to a manipulation made by the customer. The data of the order screen is acquired from the service management server 22. Furthermore, when displaying the order screen, the service server 22 checks the number of products G, which are being ordered, that are in stock. If the product is out of stock, the service server 22 displays this fact as well. When an order has been placed, the order terminal 20 receives the order from the customer and transmits the order to the server management server 22.

The processing then transitions to the service server 22. At step S21, the service server 22 calculates the drone 26 (delivery drone 26del) that is to perform the delivery and a scheduled route RTp, according to the order information Iodr received by the order terminal 20. The drone 26 or delivery drone 26del that is the current target of the processing or control is also referred to below as a "target drone 26tar".

The calculation of the target drone 26tar and the scheduled route RTp uses the delivery information Idel including the delivery destination of the product G (package), the delivery deadline, the dimensions, the weight, the presence or absence of a passenger, and the like, for example. As an example, a geographic limitation is implemented among the drones 26 based on the delivery destination. Furthermore, a limitation based on a capability (attribute) of each individual drone from among the drones 26 is implemented based on the dimensions and weight of the product G. Yet further, the scheduled route RTp is calculated based on the departure location Pst of the drone 26, the delivery destination Pdtar, and the like. Further information concerning the calculation of the scheduled route RTp is described further below. The calculation of the target drone 26tar and the scheduled route RTp may be performed before an order is placed and then determined when the order is placed.

At step S22, the service server 22 judges whether permission from the traffic server 24 is necessary for the scheduled route RTp (in other words, whether the scheduled route RTp includes a portion that requires permission from the traffic server 24), based on the first map information Imap1. An entry-limited region Rlim, for example, is included as a portion that requires permission from the traffic server 24.

If permission from the traffic server 24 is required (S22: TRUE), at step S23, a permission request for the scheduled route RTp is transmitted to the traffic management server 24. The individual information Ii such as the identification ID of the drone 26 that is the target is added to the permission request. After the transmission of the permission request, at step S24, the service server 22 monitors whether a result notification has been received from the traffic management server 24.

The processing then transitions to the traffic management server 24. At step S31, the traffic management server 24 that has received the permission request (S23) from the service server 22 judges whether to grant or deny the received permission request. For example, if the scheduled route RTp includes a temporary no-fly zone, the traffic server 24 denies the permission request. Furthermore, if this drone 26 (host machine) and one or more other drones 26 (other machines) are scheduled to pass through a portion of the scheduled route RTp at the same timing, the traffic server 24 denies the permission request. On the other hand, if there is no reason to prohibit the flight of the drone 26 in the scheduled route RTp, the traffic server 24 grants the permission request.

If the permission request is granted (S31: TRUE), at step S32, the traffic server 24 issues a priority/subordination degree R to the target drone 26tar. The priority/subordination degree R is an index (identification key) indicating a degree of priority concerning the movement of a flying body such as the drone 26.

At step S33, the traffic management server 24 transmits permission-granted notification. If the permission request is denied (S31: FALSE), at step S34, the traffic management server 24 transmits a permission-denied notification to the service server 22. A reason for the denial and the like (e.g., that the scheduled route RTp passes through a no-fly zone, the position of the no-fly zone, and the like) are also included in the permission-denied notification.

The processing then transitions to the service server 22 again. If the result received from the traffic management server 24 indicates that permission is granted (S24: TRUE), the process moves to step S25. If the result received from the traffic management server 24 indicates that permission is denied (S24: FALSE), the process returns to step S21. The service server 22 than calculates a new scheduled route RTp according to the reason for denial included in the result. For example, if the reason for denial is that the scheduled route RTp passes through a no-fly zone, the service server 22 calculates a new scheduled route RTp that avoids this no-fly zone (S21). The service server 22 then makes another flight permission request as needed (S23).

At step S25, the service server 22 transmits a delivery command to the target drone 26tar that is to deliver the product G. The delivery command includes the information of the scheduled route RTp and the priority/subordination degree R. The scheduled route RTp includes a route (outgoing route) from the departure location Pst that is the current location Pdcur (e.g., a warehouse not shown in the drawings) of the target drone 26tar to the delivery destination Pdtar and a route (return route) from the delivery destination Pdtar to a return destination Prtar.

If the target drone 26tar needs to stop by a warehouse, business office, or the like to make the delivery, the scheduled route RTp may include a route from the current location Pdcur to the warehouse or the like. Alternatively, if the target drone 26tar needs to stop by a warehouse or the like to make the delivery, a route to the warehouse, business office, or the like may be set as the scheduled route RTp. In such a case, a route to the delivery destination Pdtar and a route (return route) to the return destination Prtar may be set as a new scheduled route RTp. As described further below, the delivery command can be transmitted using a method other than being transmitted directly from the service server 22 to the target drone 26tar.

The processing then transitions to each drone 26. The drone 26 monitors whether a delivery command (S25) has been received from the service server 22. At step S51, the drone 26 that has received a delivery command starts the delivery control to carry the product G from the warehouse or business office to the delivery destination Pdtar and then return to the return destination Prtar.

(A-2-1-2. Calculation of the Scheduled Route RTp)

In the manner described above, in the present embodiment, the service server 22 calculates the target drone 26tar and the scheduled route RTp according to the order information Iodr received by the order terminal 20. When calculating the scheduled route RTp, the service server 22 calculates the departure location Pst of the target drone 26tar. The departure location Pst is set to be a warehouse for the product G, a business office where the product G is loaded into the target drone 26tar, or the like.

Next, the service server 22 calculates a necessary flight distance Dnf for delivering the product G. Specifically, the necessary flight distance Dnf is the total of the distance from the departure location Pst to the delivery destination Pdtar (outgoing route) and the distance from the delivery destination Pdtar to the return location Prtar (return route). When calculating the necessary flight distance Dnf, the service server 22 places a limitation on the scheduled route RTp of the drone 26 according to the unit classification information Isu and the individual information Ii.

FIG. 3 shows an example of a relationship between the machine classifications and geographic unit classifications into which entry is permitted. As shown in FIG. 3, in the present embodiment, a determination concerning whether flight of the target drone 26tar is possible is made for each combination of a machine classification Sp of the drone 26 and a geographic unit classification Su. The unit classification information Isu is attribute information of the geographic unit classification Su.

As shown in FIG. 3, the geographic unit classifications A to E are the geographic unit classifications Su of the present embodiment. Specifically, the geographic unit classification A is for highly populated regions and dense residential regions. The geographic unit classification B is for roads and train lines. The geographic unit classification C is for urban regions. The geographic unit classification D is for agricultural fields and rural regions. The geographic unit classification E is for freeways, rivers, and security-measures-provided areas. For the highly populated regions and dense residential regions of the geographic unit classification A, the movement of people or vehicles may be monitored by a fixed-point camera (not shown in the drawings), and the classification may be switched between the geographic unit classification A and a different geographic unit classification (any one of the geographic unit classifications B to E) according to the quantity of people or vehicles.

The individual information Ii includes the machine classification Sp of the drone 26. The machine classifications Sp include a first type to a third type. The first type is a machine for private use (e.g., commercial delivery or commercial photography), for example. The second type is a machine for general public use (e.g., patrol surveillance by the police), for example. The third type is a machine for emergency public use (e.g., disaster response, lifesaving operations, and crime response), for example. The machine classifications Sp are not limited to those above, and may also include content that reflects the presence or absence of a passenger described above. For example, display may be performed using different aspects depending on whether there is a passenger, in the machine classifications Sp described above.

In the case of the first type, flight of the drone 26 is prohibited when the geographic unit classification Su is any of the geographic unit classifications A to C. In other words, the scheduled route RTp is not selected. Furthermore, in the case of the first type, flight of the drone 26 is conditionally permitted when the geographic unit classification Su is the geographic unit classification D. In other words, the scheduled route RTp is selected only if a condition is satisfied.

This condition is a condition that the scheduled route RTp in a case where the geographic unit classification Su is bypassed is X times the distance of the scheduled route RTp in a case where the geographic unit classification Su is passed through, for example. Here, "X" is set as a fixed value from 1.5 to 3.0, for example. Furthermore, in the case of the first type, flight of the drone 26 is unconditionally permitted when the geographic unit classification Su is the geographic unit classification E. In other words, the scheduled route RTp can be selected without any limitations.

The content of FIG. 3 is stored in the first map DB 86. Accordingly, the service server 22 specifies candidates (referred to below as "unit classification candidates Suop") for regions having geographic unit classifications Su that can be selected as the scheduled route RTp, based on combinations of the individual information Ii (machine classification Sp) and the unit classification information Isu (geographic unit classification Su). The service server 22 then calculates a scheduled route RTp that passes through the unit classification candidates Suop.

Figure 4:
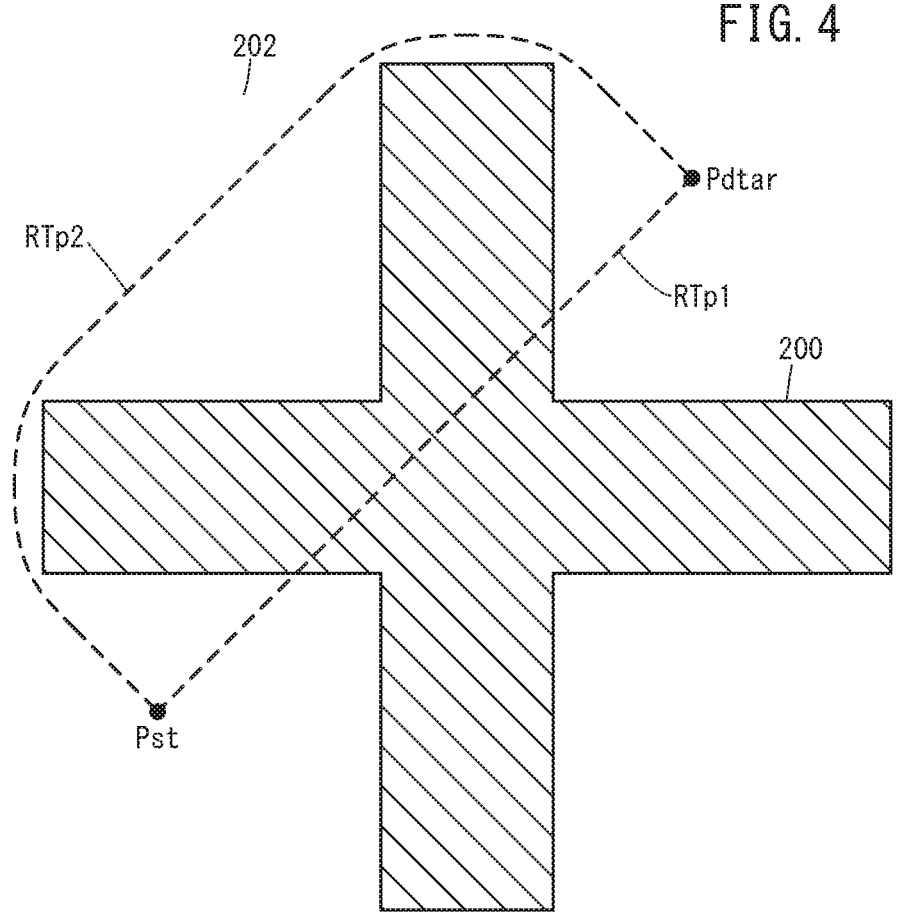
FIG. 4 shows an example of a situation of setting a scheduled route in an embodiment of the present invention.

FIG. 4 shows an example of a situation of setting a scheduled route RTp in the present embodiment. As an example, in a case where a shortest aerial route RTp1 from the departure location Pst to the delivery destination Pdtar passes through all of the unit classification candidates Suop, the service server 22 sets this shortest aerial route RTp1 as the scheduled route RTp. For example, there is a case where the machine classification Sp is the third type, a first region 200 is associated with the geographic unit classification C, and a second region 202 in the vicinity of the first region 200 is associated with the geographic unit classification D.

Furthermore, it is possible for there to be a case where there is a no-fly zone along the shortest aerial route RTp1. For example, there is a case where the machine classification Sp is the first type, the first region 200 is associated with the geographic unit classification C, and the region near the second region 202 that is in the vicinity of the first region 200 is associated with the geographic unit classification E. In such a case, the service server 22 sets, as the scheduled route RTp, a route (shortest detour route RTp2) that is the shortest route that does not pass through a no-fly zone among route options RTop from the departure location Pst to the delivery destination Pdtar.

Furthermore, there can be a case where there is a conditionally flight-permitted region along the shortest aerial route RTp1. For example, there is a case where the machine classification Sp is the second type, the first region 200 is associated with the geographic unit classification C, and the region near the second region 202 that is in the vicinity of the first region 200 is associated with the geographic unit classification D. In such a case, the service server 22 compares a first necessary flight distance Dnp1 of the shortest aerial route RTp1 to a second necessary flight distance Dnp2 of the shortest detour route RTp2. Then, if the second necessary flight distance Dnp2 is greater than or equal to X times the first necessary flight distance Dnp1, the service server 22 selects the shortest aerial route RTp1 as the scheduled route RTp. On the other hand, if the second necessary flight distance Dnp2 is not greater than or not equal to X times the first necessary flight distance Dnp1, the service server 22 selects the shortest detour route RTp2 as the scheduled route RTp.

Furthermore, the content of FIG. 3 is stored in the second map DB 130. However, the content stored in the second map DB 130 can also include temporary entry-limited regions RTlimp that are not stored in the first map DB 86. The traffic server 24 receives the individual information Ii (machine classification Sp) and the scheduled route RTp from the service server 22. The traffic server 24 then specifies each geographic unit classification Su along the scheduled route RTp and judges whether to grant the flight permission request based on the combination of each geographic unit classification Su and the individual information Ii (machine classification Sp).

(A-2-1-3. Issuance of the Priority/Subordination Degree R by the Traffic Management Server 24)

As described above, if the permission request is granted (S31 of FIG. 2: TRUE), the traffic server 24 issues a priority/subordination degree R to the target drone 26tar (S32). The priority/subordination degree R is an index (identification key) indicating a degree of priority concerning movement of a flying body such as a drone 26.

In the present embodiment, the traffic server 24 issues the priority/subordination degrees R according to the machine classifications Sp and the order of the flight permission requests. In other words, the priority/subordination degree R is an identification key that includes a portion corresponding to the machine classification Sp and a portion corresponding to the order of the flight permission request. The issued priority/subordination degree R is transmitted to the service server 22 with the permission-granted notification (S33 of FIG. 2), and is registered in the flight schedule DB 132 as a portion of the flight schedule information Isc.

[A-2-2. During Flight of the Drone 26]

As described above, in the present embodiment, the display of the drone display apparatus 158 is controlled according to the priority/subordination degree R while the drone 26 is flying.

(A-2-2-1. Drone-Side Display Control)

Figure 5:
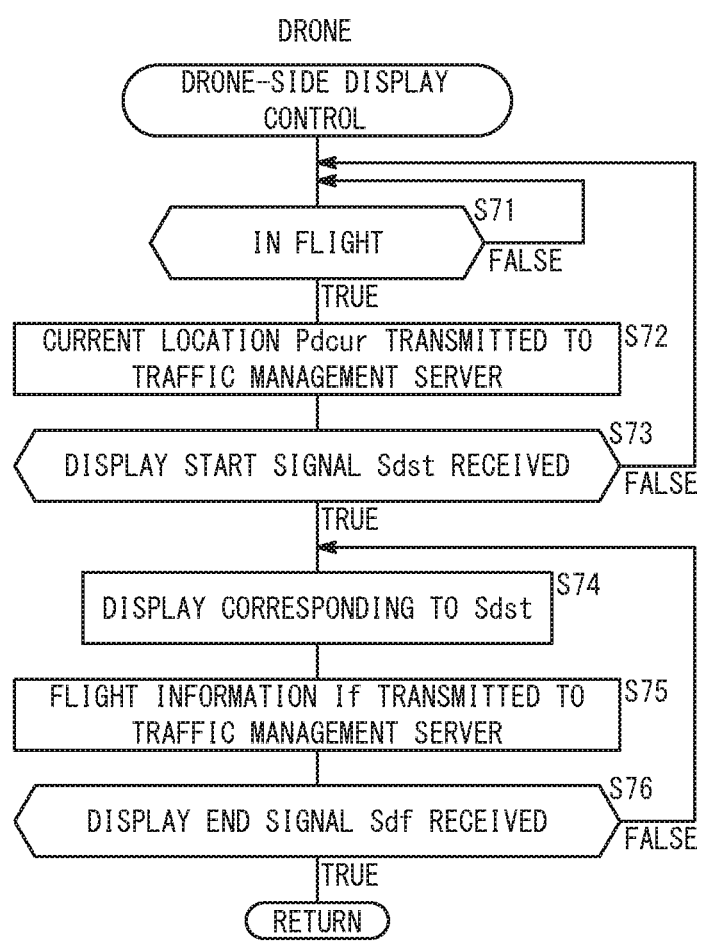
FIG. 5 is a flow chart of drone-side display control in an embodiment of the present invention.

FIG. 5 is a flow chart of the drone-side display control in the present embodiment. The drone-side display control is performed by the drone control apparatus 154 of the drone 26. At step S71, the drone 26 judges whether the drone 26 itself is in flight. This judgment is performed using the ground altitude H, for example. If the drone 26 is in flight (S71: TRUE), the process moves to step S72. If the drone 26 is not in flight (S71: FALSE), step S71 is repeated.

At step S72, the drone 26 transmits the current location Pdcur to the traffic server 24. At step S73, the drone 26 judges whether a display start signal Sdst has been received from the traffic server 24. The display start signal Sdst is a signal instructing the drone 26 to start the display of the drone display apparatus 158, and is transmitted from the traffic server 24 at step S94 of FIG. 6 described further below. If the display start signal Sdst has been received (S73: TRUE), the process moves to step S74. If the display start signal Sdst has not been received (S73: FALSE), the process returns to step S71.

At step S74, the drone 26 performs display corresponding to the display start signal Sdst, with the drone display apparatus 158. For example, in a case where the display indicated by the display start signal Sdst is a color (e.g., red) for indicating that entry into an entry-limited region Rlim is permitted for emergency purposes, the drone control apparatus 154 causes the drone display apparatus 158 to display this color. As described above, emergency purposes correspond to a case where the machine classification Sp is the third type, for example. Furthermore, in a case where the display indicated by the display start signal Sdst is a color (e.g., yellow) for indicating that entry into an entry-limited region Rlim is permitted if a distance condition is satisfied, the drone control apparatus 154 causes the drone display apparatus 158 to display this color.

At step S75, the drone 26 transmits the flight information If to the traffic server 24. The flight information If includes the current location Pdcur, the flight velocity Vd, and the altitude H.

At step S76, the drone 26 judges whether a display end signal Sdf has been received from the traffic server 24. The display end signal Sdf is a signal instructing the drone 26 to end the display of the drone display apparatus 158, and is transmitted from the traffic server 24 at step S99 of FIG. 6 described further below. If the display end signal Sdf has been received (S76: TRUE), the current drone-side display control is finished, and the process returns to step S71. If the display end signal Sdf has not been received (S76: FALSE), the process returns to step S74.

(A-2-2-2. Server-Side Display Control)

Figure 6:
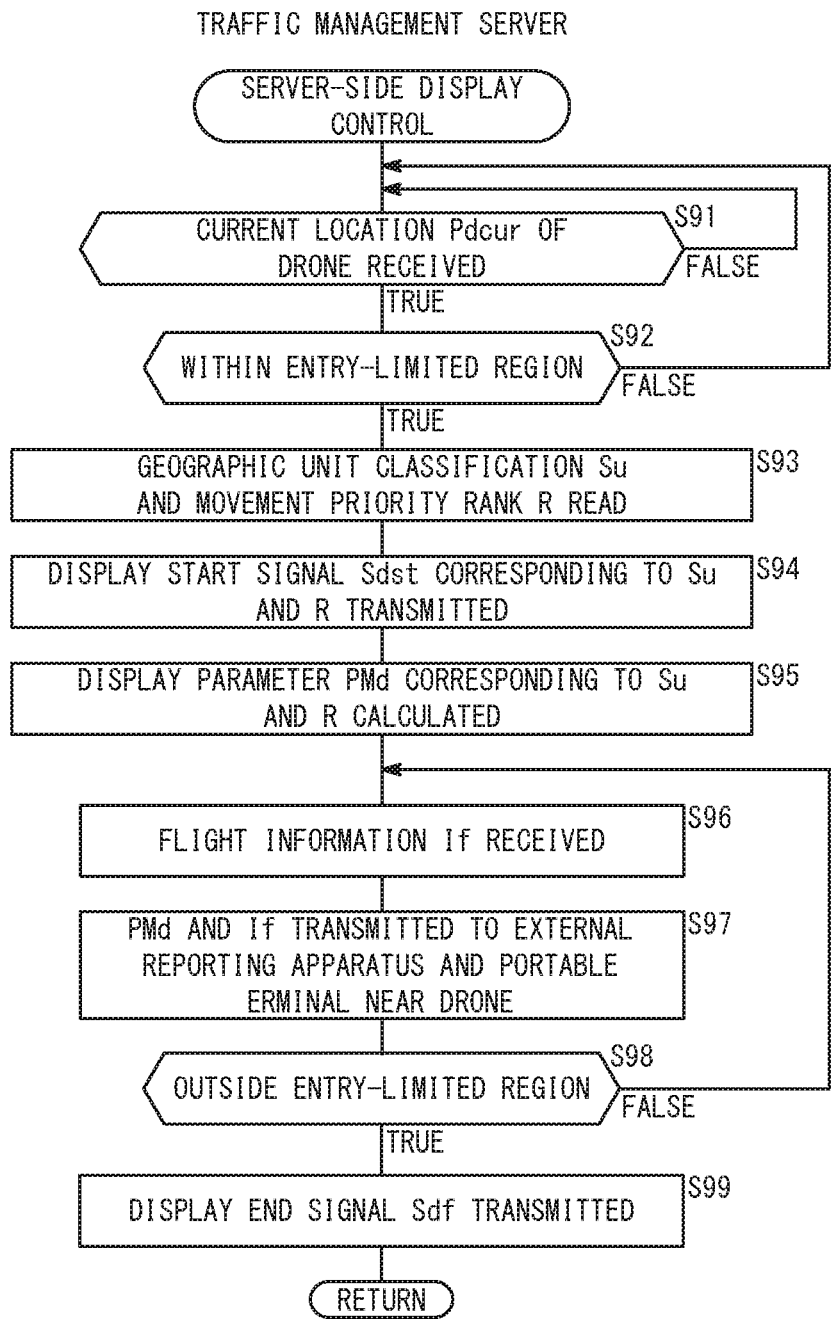
FIG. 6 is a flow chart of server-side display control in an embodiment of the present invention.

FIG. 6 is a flow chart of the server-side display control in the present embodiment. The server-side display control is performed by the calculating section 104 of the traffic management server 24. The server-side display control includes first display control performed by the first display control section 122, second display control performed by the second display control section 124, and output control performed by the third display control section 126.

The first display control is for controlling the display of the drone display apparatus 158 of the drone 26 according to the priority/subordination degree R, and corresponds to steps S91 to S94 and S99 of FIG. 6. The second display control is for controlling the display of the external display apparatus 172 of the external reporting apparatus 32 according to the priority/subordination degree R, and corresponds to steps S91 to S93 and S95 to S99 of FIG. 6. The output control is for controlling display and audio output of the user interface section 186 (the portable display apparatus 182 and the speaker 184) of the portable terminal 34 according to the priority/subordination degree R, and corresponds to steps S91 to S93 and S95 to S99 of FIG. 6.

At step S91, the traffic server 24 judges whether the current location Pdcur (or current location notification signal) has been received from the drone 26. If the current location Pdcur has been received (S91: TRUE), the process moves to step S92. If the current location Pdcur has not been received (S91: FALSE), step S91 is repeated.

At step S92, the traffic server 24 judges whether the current location Pdcur of the drone 26 is within an entry-limited region Rlim. If the current location Pdcur is within an entry-limited region Rlim (S92: TRUE), the process moves to step S93. If the current location Pdcur is not within an entry-limited region Rlim (S92: FALSE), the process returns to step S91.

At step S93, the traffic server 24 reads the geographic unit classification Su corresponding to the current location Pdcur from the second map DB 130, and reads the priority/subordination degree R of the drone 26 from the flight schedule DB 132. As described above, the priority/subordination degree R is an index (identification key) indicating a degree of priority concerning movement of a flying body such as a drone 26. The priority/subordination degree R is registered in the flight schedule DB 132 as a portion of the flight schedule information Isc, along with the transmission of the permission-granted notification (S33 of FIG. 2).

At step S94, the traffic server 24 transmits the display start signal Sdst, which commands the start of the display corresponding to the geographic unit classification Su and the priority/subordination degree R, to the drone 26. As described above, the display start signal Sdst also designates a display color to be displayed by the drone display apparatus 158.

At step S95, the traffic server 24 calculates a display parameter PMd corresponding to the geographic unit classification Su and the priority/subordination degree R. The display parameter PMd is used for the display by the external display apparatus 172 and the portable terminal 34. A display parameter PMd for the external display apparatus 172 and a display parameter PMd for the portable terminal 34 may be calculated individually.

The display parameter PMd designates the display color to be displayed by the external display apparatus 172. The display parameter PMd may designate something other than a color (e.g., a display shape such as an arrow) concerning the external display apparatus 172.

Furthermore, the display parameter PMd designates a display color to be displayed by the portable display apparatus 182 and an output sound to be output by the speaker 184. The display parameter PMd may designate something other than a display color (e.g., a display shape such as an arrow or the display of the flight information If) concerning the portable display apparatus 182. Furthermore, in a case where the target drone 26tar is granted permission and passes through an entry-limited region Rlim, for example, the output sound can be a voice indicating that the target drone 26tar is passing through this entry-limited region Rlim. Furthermore, in a case where the target drone 26tar is passing through an entry-limited region Rlim without being granted permission, the output sound can be a voice warning the target drone 26tar of this fact.

At step S96, the traffic server 24 receives the flight information If from the target drone 26tar. The flight information If includes the current location Pdcur, the flight velocity Vd, and the altitude H. At step S97, the flight information If and the display parameter PMd are transmitted to the external reporting apparatus 32 and the portable terminal 34 located in the vicinity of the target drone 26tar. The designations of only the external reporting apparatus 32 and the portable terminal 34 located in the vicinity of the target drone 26tar are performed by using a geographic region code with which the current location Pdcur is associated, for example.

If the traffic server 24 includes a database in which position information of the external reporting apparatus 32 is accumulated, the traffic server 24 may specify the external reporting apparatus 32 to transmit the flight information If and the display parameter PMd. The traffic server 24 may transmit the flight information If and the display parameter PMd to the specified external reporting apparatus 32.

At step S98, the traffic server 24 judges whether the current location Pdcur of the drone 26 is outside the entry-limited region Rlim. If the current location Pdcur is outside the entry-limited region Rlim (S98: TRUE), the process moves to step S99. If the current location Pdcur is not outside the entry-limited region Rlim (S98: FALSE), i.e., if the current location Pdcur continues to be within the entry-limited region Rlim, the process returns to step S96.

At step S99, the traffic server 24 transmits the display end signal Sdf, which commands ending of the display for the target drone 26tar, to the drone 26.

(A-2-2-3. Peripheral Display Control)

Figure 7:
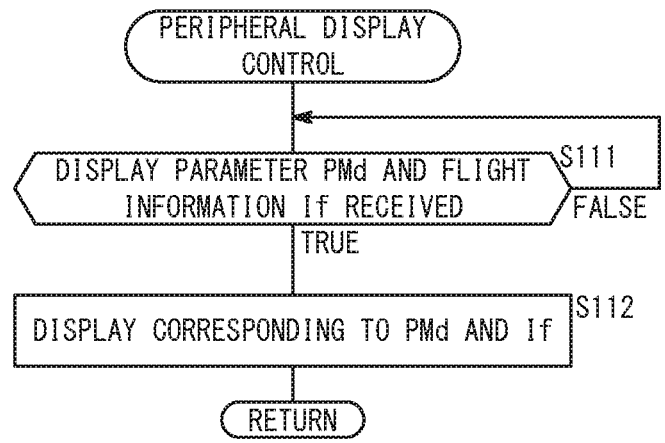
FIG. 7 is a flow chart of vicinity display control in an embodiment of the present invention.

FIG. 7 is a flow chart of peripheral display control in the present embodiment. The peripheral display control is performed by the peripheral device 28 (external reporting apparatus 32 and portable terminal 34). At step S111, the peripheral device 28 (external reporting apparatus 32 and portable terminal 34) judges whether the display parameter PMd and the flight information If of the target drone 26tar have been received from the traffic server 24. If the display parameter PMd and the flight information If have been received (S111: TRUE), the process moves to step S112. If the display parameter PMd or the flight information If has not been received (S111: FALSE), step S111 is repeated.

As described above, since only the external reporting apparatus 32 and the portable terminal 34 located in the vicinity of the target drone 26tar receive the above information, the peripheral device 28 operates such as described below. That is, the peripheral device 28 judges whether the geographic region code, which is transmitted along with the display parameter PMd and the flight information If, corresponds to the geographic region with which this peripheral device 28 is associated. Accordingly, even if the display parameter PMd and the flight information If reach the peripheral device 28, the peripheral device 28 does not receive the display parameter PMd and the flight information If (including a case where this information is temporarily received and then immediately deleted) if the geographic region code corresponding to the geographic region with which this peripheral device 28 is associated is not included.

At step S112, the peripheral device 28 performs display corresponding to the display parameter PMd and the flight information If. Specifically, while the display parameter PMd and the flight information If continue to be received, the external reporting apparatus 32 displays a display corresponding to the display parameter PMd and the flight information If in the external display apparatus 172. The display corresponding to the display parameter PMd is display in a display color designated by the display parameter PMd. Furthermore, if the display parameter PMd includes a designation of something other than the display color (e.g., a display shape such as an arrow or display of the flight information If), the display of the designated content is also included.

Upon receiving the display parameter PMd and the flight information If, the portable terminal 34 displays the display corresponding to the display parameter PMd and the flight information If in the portable display apparatus 182 as a pop-up display. The display content can be similar to that of the external reporting apparatus 32. Furthermore, if the display parameter PMd includes an output sound designation, the portable terminal 34 outputs the designated output sound from the speaker 184. An output sound similar to that of the portable terminal 34 may be output by the external reporting apparatus 32.

A-3. Effect of the Present Embodiment

According to the present embodiment, the display of the drone display apparatus 158 (first display apparatus) of the target drone 26tar (autonomous flying body) is controlled according to the priority/subordination degree R (S74 of FIG. 5 and S94, S98, and S99 of FIG. 6). In this way, people around the target drone 26tar can recognize the priority/subordination degree R of the target drone 26tar due to the display of the drone display apparatus 158. Therefore, the people around the target drone 26tar can easily judge whether the target drone 26tar is permitted to enter into an entry-limited region Rlim. Accordingly, it becomes easy for the people around the target drone 26tar to understand the movement state of the target drone 26tar. Therefore, people can have a sense of security if the target drone 26tar is moving correctly, for example.

In the present embodiment, the management system 10 includes the second map DB 130 (map information database) in which the second map information Imap2 is accumulated and the moving body DB 84 in which the individual information Ii of a plurality of moving bodies is accumulated (FIG. 1). The management system 10 further includes the GPS sensor 160 (position detecting unit) that detects the current location Pdcur of the target drone 26tar (autonomous moving body). Furthermore, the second map DB 130 includes the unit classification information Isu, which is the attribute information of each geographic classification unit, as the second map information Imap2. Furthermore, the first display control section 122 controls the display of the drone display apparatus 158 (first display apparatus) based on the priority/subordination degree R and the geographic unit classification Su corresponding to the current location Pdcur of the target drone 26tar (S74 of FIG. 5 and S94, S98, and S99 of FIG. 6).

In this way, the display of the drone display apparatus 158 of the target drone 26tar is controlled according to, in addition to the priority/subordination degree R, the geographic unit classification Su corresponding to the current location Pdcur of the target drone 26tar. Accordingly, as an example, it is possible to perform display that takes into consideration both the geographic unit classification Su and the priority/subordination degree R, such as performing display corresponding to the priority/subordination degree R only when the geographic unit classification Su requires the display of the drone display apparatus 158 or the like.

In the present embodiment, the management system 10 includes the external display apparatus 172 (second display apparatus) that is fixed to the ground and performs display directed outward and the second display control section 124 that performs the second display control for controlling the display of the external display apparatus 172 (FIG. 1). Furthermore, the second display control section 124 controls the display of the external display apparatus 172 according to the priority/subordination degree R of the target drone 26tar (autonomous moving body) when the target drone 26tar passes through the vicinity of the external display apparatus 172 (S97 of FIG. 6 and S112 of FIG. 7). In this way, when the target drone 26tar passes through the vicinity of the external display apparatus 172, the people around the external display apparatus 172 can learn the priority/subordination degree R of the target drone 26tar. In the present embodiment, the management system 10 includes the portable terminal 34 that includes the user interface section 186 for performing display or audio output (FIG. 1). The management system 10 further includes the third display control section 126 (output control section) that performs output control for controlling the display or audio output of the user interface section 186. Furthermore, the third display control section 126 controls the display or audio output of the user interface section 186 according to the priority/subordination degree R of the target drone 26tar (autonomous moving body) when the target drone 26tar passes through the vicinity of the portable terminal 34 (S97 of FIG. 6 and S112 of FIG. 7). In this way, when the target drone 26tar passes through the vicinity of the portable terminal 34, the user of the portable terminal 34 can learn the priority/subordination degree R of the target drone 26tar.

In the present embodiment, the third display control section 126 (output control section) performs a process such as described below when the target drone 26tar (autonomous flying body) passes through the vicinity of the portable terminal 34. That is, when this occurs, the third display control section 126 causes the user interface section 186 to display the flight information If (movement state information indicating the movement state) of the target drone 26tar and the display parameter PMd (information of the priority/subordination degree R) (S97 of FIG. 6 and S112 of FIG. 7). In this way, when the target drone 26tar passes through the vicinity of the portable terminal 34, the user of the portable terminal 34 can learn the movement state (e.g., the flight velocity Vd, the altitude H, and the like) and the priority/subordination degree R of the target drone 26tar.

B. Modifications

The present invention is not limited to the above embodiments, and it is obvious that various configurations can be adopted based on the content recorded in this specification. For example, the configurations described below can be adopted.

B-1. Moving Body

The drone 26 of the embodiment described above is used for delivery (FIGS. 1 and 2). However, from the viewpoint of controlling the display of the drone display apparatus 158, the external display apparatus 172, or the portable display apparatus 182 according to the priority/subordination degree R of the drone 26, for example, the present invention is not limited to this. As an example, the drone 26 can be used for purposes such as transportation of people, emergency applications, photography, advertising, security surveillance, surveying, entertainment, and personal hobbies.

In the embodiment described above, the present invention is applied to a drone 26 (FIGS. 1 and 2). However, from the viewpoint of controlling the display of a display apparatus provided to a moving body or outside the moving body according to the priority/subordination degree R of the moving body, for example, the present invention may be applied to a different type of flying body or autonomous moving body. For example, the present invention can also be applied to a self-driving automobile, a helicopter, or a ship.

B-2. Movement Managing Section 30

The movement managing section 30 of the embodiment described above includes the service server 22 and the traffic server 24 (FIG. 1). However, from the viewpoint of managing the movement of a plurality of drones 26 (or autonomous moving bodies), for example, the present invention is not limited to this. For example, the movement managing section 30 may be formed by only the traffic server 24. Alternatively, in addition to the service server 22 and the traffic server 24, a plurality of local management servers that manage the flight of the drones 26 can be provided arranged respectively in prescribed regions. Then the command from the service server 22 or the traffic server 24 to a drone 26 may be transmitted via a local management server.

The service server 22 of the embodiment described above manages the delivery of a product G (FIG. 1). However, from the viewpoint of controlling the display of the drone display apparatus 158, the external display apparatus 172, or the portable display apparatus 182 according to the priority/subordination degree R of the drone 26, for example, the present invention is not limited to this. For example, the service server 22 may manage uses such as transportation of people, emergency applications, photography, advertising, security surveillance, surveying, entertainment, and personal hobbies.

B-3. Moving Body DB 84

In the embodiment described above, the service server 22 is provided with the moving body DB 84 in which the individual information Ii of the drone 26 is accumulated (FIG. 1), and the individual information Ii of the target drone 26tar is provided from the service server 22 to the traffic server 24 (S23 of FIG. 2). However, from the viewpoint of having the traffic server 24 acquire the individual information Ii of the target drone 26tar (or moving body) and specify the priority/subordination degree R, for example, the present invention is not limited to this. For example, the traffic server 24 may also be provided with a moving body database in which the individual information Ii of the moving body is accumulated. In this case, the traffic server 24 may specify the priority/subordination degree R by receiving the identification ID of the target drone 26tar from the service server 22 or the target drone 26tar.

B-4. Display Control

In the embodiment described above, the traffic server 24 controls the display of the drone display apparatus 158 according to the priority/subordination degree R via the drone control apparatus 154 (FIGS. 5 and 6). However, from the viewpoint of controlling the display of the drone display apparatus 158 according to the priority/subordination degree R of the drone 26, for example, the present invention is not limited to this. For example, the service server 22 may control the drone display apparatus 158 via the drone control apparatus 154. Alternatively, the drone control apparatus 154 that has received the notification concerning the priority/subordination degree R from the traffic server 24 may control the display of the drone display apparatus 158.

In the embodiment described above, the display of the drone display apparatus 158 is performed only when the target drone 26tar is within the entry-limited region Rlim (S92 of FIG. 6: TRUE) (S94 of FIGS. 6 and S73 of FIG. 5: TRUE, S74). However, from the point of view of controlling the display of the drone display apparatus 158 according to the priority/subordination degree R of the drone 26, for example, the present invention is not limited to this and the display of the drone display apparatus 158 may also be performed when the target drone 26tar is outside the entry-limited region Rlim.

B-5. Miscellaneous

In the embodiment described above, the flow shown in FIGS. 2 and 5 to 7 is used. However, as long as the effect of the present invention can be realized, for example, the content of the flow (the order of the steps) is not limited to the above description. For example, the order of the steps S74 and S75 of FIG. 5 can be switched.

In the embodiment described above, an example is described of a case in which the host machine 26 and the other machine 26 are both drones, i.e., autonomous moving bodies, but the present invention is not limited to this. For example, the other machine 26 may be a non-autonomous moving body.

Figure 8:
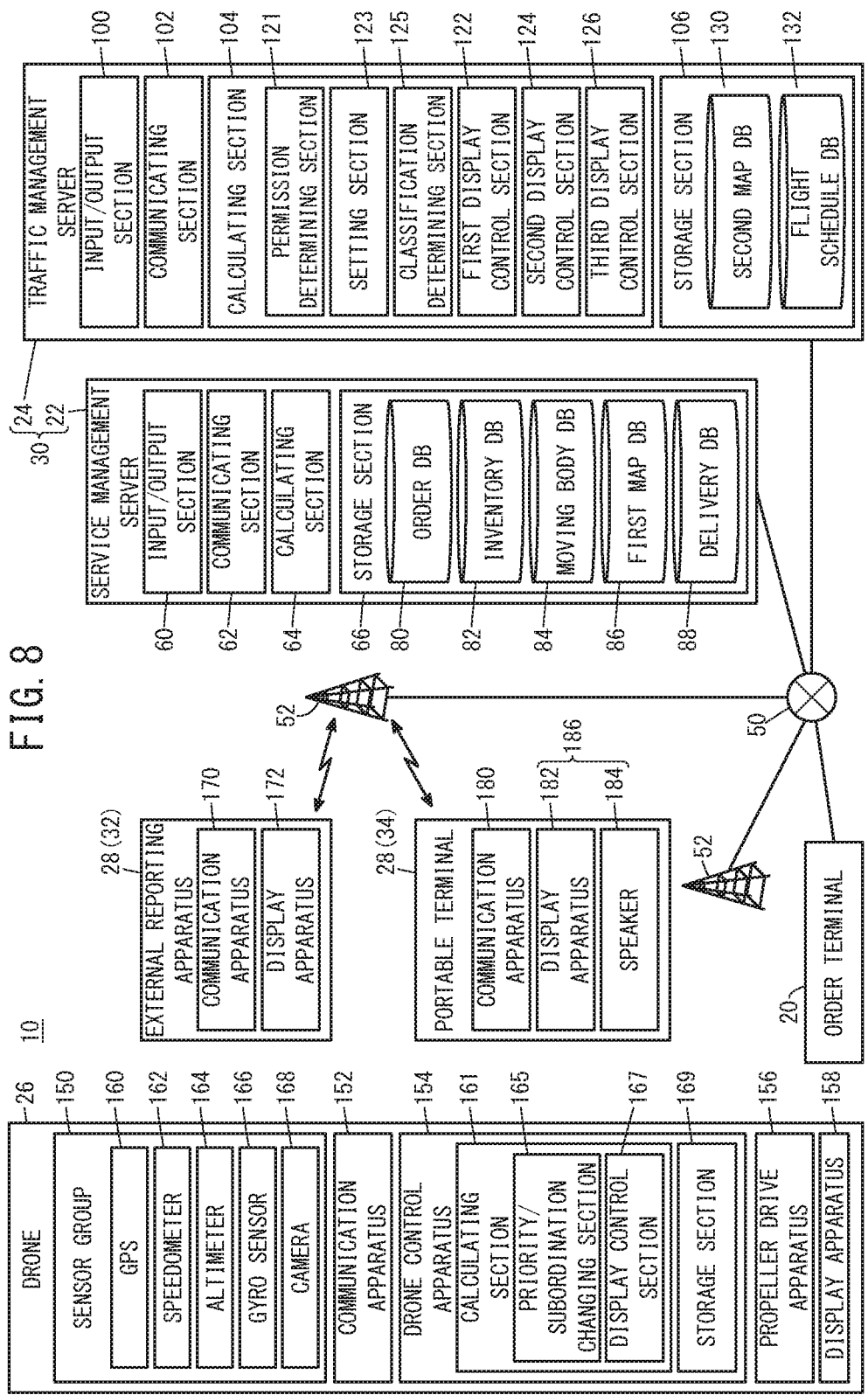
FIG. 8 is an overall configurational view of an outline of the management system according to a modification of an embodiment of the present invention.

In the embodiment described above, an example is described of a case in which the display of the drone display apparatus 158 is controlled according to the priority/subordination degree R, but the present invention is not limited to this. The display of the drone display apparatus 158 may be controlled according to a geographic region in which the drone 26 is permitted to move. FIG. 8 is an overall configurational view of an outline of a management system according to a modification of the embodiment. As shown in FIG. 8, the movement managing section 30 includes a permission determining section 121, a setting section 123, and a classification determining section 125. The permission determining section 121, the setting section 123, and the classification determining section 125 can be realized by executing a program stored in the storage section 106 with the calculating section 104. FIG. 8 shows a case in which the permission determining section 121, the setting section 123, and the classification determining section 125 are included in the traffic management server 24, but the present invention is not limited to this. The permission determining section 121 can determine a geographic region in which the drone 26 is permitted to move. The setting section 123 sets the geographic region to have a geographic unit classification Su according to a geographic attribute. The geographic unit classifications Su can be the geographic unit classifications A to E such as shown in FIG. 9, for example, but the present invention is not limited to this. FIG. 9 shows an example of a relationship between permission classifications and geographic unit classifications of regions into which entry is permitted. As shown in FIG. 9, the permission classifications can be a permission classification α, a permission classification β, and a permission classification γ, but the present invention is not limited to this. The geographic unit classifications Su can be the geographic unit classification A, the geographic unit classification B, the geographic unit classification C, the geographic unit classification D, and the geographic unit classification E, in the same manner as in FIG. 3, but the present invention is not limited to this. As described above using FIG. 3, the geographic unit classification A is for highly populated regions and dense residential regions, for example. As described above using FIG. 3, the geographic unit classification B is for roads and train lines, for example. As described above using FIG. 3, the geographic unit classification C is for urban regions, for example. As described above using FIG. 3, the geographic unit classification D is for agricultural fields and rural regions, for example. As described above using FIG. 3, the geographic unit classification E is for freeways, rivers, and security-measures-provided areas.

As shown in FIG. 9, a machine having the permission classification α is prohibited from entering into a region with any of the geographic unit classifications A to C, for example. Furthermore, a machine having the permission classification α is conditionally permitted to enter into a region with the geographic unit classification D, for example. Yet further, a machine having the permission classification α is unconditionally permitted to enter into a region with the geographic unit classification E, for example. A machine having the permission classification α can correspond to a machine for private use, for example. As an example, a machine used for commercial delivery, non-commercial delivery, commercial photography, non-commercial photography, and the like can correspond to the machine having the permission classification α.

A machine having the permission classification β is prohibited from entering into a region with the geographic unit classification A, for example. Furthermore, a machine having the permission classification β is conditionally permitted to enter into regions with the geographic unit classifications B and C, for example. Yet further, a machine having the permission classification β is unconditionally permitted to enter into regions with the geographic unit classifications D and E, for example. A machine having the permission classification β can correspond to a machine for general public use, for example. As an example, a machine used for patrol surveillance by the police or the like can correspond to the machine having the permission classification β.

A machine having the permission classification γ is conditionally permitted to enter into regions with the geographic unit classifications A and B, for example. Furthermore, a machine having the permission classification γ is unconditionally permitted to enter into a region with any one of the geographic unit classification C to E, for example. A machine having the permission classification γ can correspond to a machine for emergency public use, for example. As an example, a machine used for disaster response, lifesaving operations, crime response, or the like can correspond to the machine having the permission classification γ.

The classification determining section 125 determines, for each drone 26, each geographic unit classification Su in which the drone 26 is permitted to move. For example, the classification determining section 125 determines one of the permission classifications α to γ for each drone 26. For each permission classification α to γ, a geographic unit classification Su of a region into which the drone 26 given this permission classification α to γ can enter is determined in advance. Therefore, by determining one of these permission classifications α to γ for each drone 26, the classification determining section 125 can determine the geographic unit classification Su in which each of these drones 26 is permitted to move.

The permission determining section 121 determines the geographic region in which a drone 26 is permitted to move, based on the geographic unit classification Su determined by the classification determining section 125.

The display control section 167 controls the display of the drone display apparatus 158 according to the geographic region determined by the permission determining section 121. The display control section 167 may control the display of the drone display apparatus 158 according to the geographic unit classification Su determined by the classification determining section 125. In this way, the display of the drone display apparatus 158 may be controlled according to the geographic region in which this drone 26 is permitted to move.

REFERENCE SIGNS LIST

10: management system
24: traffic management server (management server)
26: drone (autonomous moving body)
30: movement managing section
34: portable terminal
62: communicating section (communication apparatus)
84: moving body DB 120: priority/subordination determining section
121: permission determining section
122: first display control section
123: setting section
124: second display control section (display control section)
125: classification determining section
126: third display control section (output control section, display control section)
130: second map DB (map database)
154: drone control apparatus (autonomous control section)
158: drone display apparatus (first display apparatus)
160: GPS sensor (position detecting unit)
165: priority/subordination changing section
167: display control section
172: external display apparatus (second display apparatus, display apparatus)
182: portable display apparatus (display apparatus)
186: user interface section
If: flight information (movement state information)
Ii: individual information
Isu: unit classification information
Pdcur: current location
Pst: departure location
Ptar: destination
R: priority/subordination degree
Su: unit classification

What is claim is:

1. A management system comprising one or more processors, wherein the one or more processors of the management system communicate with a plurality of moving bodies via a communication apparatus and manages movement of the plurality of moving bodies, the moving bodies including an autonomous moving body that includes one or more processors of the moving body for autonomous movement,
wherein the autonomous moving body includes a display apparatus configured to perform display directed outward,
the one or more processors of the management system determine priority/subordination degrees concerning movement of the plurality of moving bodies, based on individual information of the plurality of moving bodies,
the one or more processors of the autonomous moving body control the display of the display apparatus according to the priority/subordination degree determined by the one or more processors of the management system, and
the individual information includes machine information determined based on use application of the moving body.

2. The management system according to claim 1, comprising:
a map information database in which map information is accumulated; and
a moving body database in which the individual information of the plurality of moving bodies is accumulated;
wherein the one or more processors of the management system detect a current location of the autonomous moving body,
the map information database includes unit classification information, which is attribute information of each geographic unit classification, as the map information, and
the one or more processors of the moving body control the display of the display apparatus based on the priority/subordination degree and the unit classification corresponding to the current location of the autonomous moving body.

3. The management system according to claim 1, wherein the machine information includes a machine classification, and the use application of a moving body associated with a first machine classification among a plurality of the machine classifications has a more public nature than the use application of a moving body associated with a second machine classification among the plurality of machine classifications.

4. The management system according to claim 3, wherein the first machine classification is divided into at least an emergency machine classification and a general machine classification, and
the use application of a moving body associated with the emergency machine classification has a higher degree of urgency than the use application of a moving body associated with the general machine classification.

5. The management system according to claim 3, wherein the second machine classification is divided into at least a commercial machine classification and a non-commercial machine classification,
a moving body associated with the commercial machine classification is used for commercial purposes, and
a moving body associated with the non-commercial machine classification is used for non-commercial purposes.

6. The management system according to claim 3, wherein the one or more processors of the management system determine the priority/subordination degree of a moving body for which the machine information indicates the first machine classification to be higher than the priority/subordination degree of a moving body for which the machine information indicates the second machine classification.

7. A management system comprising one or more processors, the one or more processors of the management system communicate with a plurality of moving bodies via a communication apparatus and manages movement of the plurality of moving bodies, the moving bodies including an autonomous moving body that includes one or more processors of the moving body for autonomous movement, the management system comprising:
a display apparatus provided outside the autonomous moving body;
wherein the one or more processors of the management system control display of the display apparatus,
wherein the one or more processors of the management system determine priority/subordination degrees concerning movement of the plurality of moving bodies, based on individual information of the plurality of moving bodies, and
control the display of the display apparatus according to the priority/subordination degree of the autonomous moving body, when the autonomous moving body is near the display apparatus.

8. A management system comprising one or more processors, wherein the one or more processors of the management system communicate with a plurality of moving bodies via a communication apparatus and manages movement of the plurality of moving bodies, the moving bodies including an autonomous moving body that includes one or more processors of the moving body for autonomous movement,
wherein the autonomous moving body includes a display apparatus configured to perform display directed outward,
the one or more processors of the management system determine priority/subordination degrees concerning movement of the plurality of moving bodies, based on individual information of the plurality of moving bodies, the one or more processors of the autonomous moving body control the display of the display apparatus according to the one or more processors of the management system, and the one or more processors of the moving body change the priority/subordination degree determined by the one or more processors of the management system.

9. The management system according to claim 8, wherein the one or more processors of the moving body change the priority/subordination degree based on presence or absence of a passenger in the autonomous moving body.

10. The management system according to claim 8, wherein the one or more processors of the moving body change the priority/subordination degree based on a movement velocity of the autonomous moving body.

11. The management system according to claim 8, wherein the one or more processors of the moving body change the priority/subordination degree based on a movement altitude of the autonomous moving body.

12. The management system according to claim 8, wherein the one or more processors of the moving body change the priority/subordination degree based on a remaining capacity of a propulsion energy source of the autonomous moving body.

13. The management system according to claim 8, wherein the one or more processors of the moving body change the priority/subordination degree based on a movable distance using a propulsion energy source of the autonomous moving body.

14. A control method for a management system comprising one or more processors, wherein the one or more processors of the management system communicate with a plurality of moving bodies via a communication apparatus and manages movement of the plurality of moving bodies, the moving bodies including an autonomous moving body that includes one or more processors of the moving body for autonomous movement and a display apparatus configured to perform display directed outward, the method comprising the steps of:

determining priority/subordination degrees concerning movement of the plurality of moving bodies by the one or more processors of the management system, based on individual information of the plurality of moving bodies, and controlling the display of the display apparatus according to the priority/subordination degree by the one or more processors of the autonomous moving body, wherein the individual information includes machine information determined based on use application of the moving body.

15. A management server comprising one or more processors, the one or more processors of the management server communicate with a plurality of moving bodies and manages movement of the plurality of moving bodies, the moving bodies including an autonomous moving body that includes one or more processors of the moving body for autonomous movement and a display apparatus configured to perform display directed outward, wherein the one or more processors of the management server:

determine priority/subordination degrees concerning movement of the plurality of moving bodies, based on individual information of the plurality of moving bodies; and control the display of a display apparatus of the moving autonomous body that performs display directed outward, according to the priority/subordination degree, wherein the individual information includes machine information determined based on use application of the moving body.

16. A management system comprising one or more processors, wherein the one or more processors of the management system communicate with a plurality of moving bodies via a communication apparatus and manages movement of the plurality of moving bodies, the moving bodies including an autonomous moving body that includes one or more processors of the moving body for autonomous movement, wherein the autonomous moving body includes a display apparatus configured to perform display directed outward, the one or more processors of the management system determine priority/subordination degrees concerning movement of the plurality of moving bodies, based on individual information of the plurality of moving bodies, the one or more processors of the autonomous moving body control the display of the display apparatus according to the priority/subordination degree determined by one or more processors of the management system, and the individual information includes at least one of passenger information determined based on presence or absence of a passenger in the moving body and loaded object information determined based on a value of a loaded object in the moving body.

17. The management system according to claim 16, wherein the individual information includes passenger information determined based on presence or absence of a passenger in the moving body.

18. The management system according to claim 17, wherein the one or more processors of the management system determine the priority/subordination degree of a moving body for which the passenger information indicates that there is a passenger, to be higher than the priority/subordination degree of a moving body for which the passenger information indicates that there is no passenger.

19. The management system according to claim 16, wherein the individual information includes loaded object information determined based on a value of a loaded object in the moving body.

20. The management system according to claim 19, wherein the one or more processors of the management system determine the priority/subordination degree of a moving body for which the loaded object information indicates a first value to be higher than the priority/subordination degree of a moving body for which the loaded object information indicates a second value that is less than the first value.

21. A management system comprising one or more processors, wherein the one or more processors of the management system communicate with a plurality of moving bodies via a communication apparatus and manages movement of the plurality of moving bodies, the moving bodies including an autonomous moving body that includes one or more processors of the moving body for autonomous movement, wherein the autonomous moving body includes a display apparatus configured to perform display directed outward, the one or more processors of the management system determine priority/subordination degrees concerning movement of the plurality of moving bodies, based on individual information of the plurality of moving bodies, the one or more processors of the autonomous moving body control the display of the display apparatus according to the priority/subordination degree determined by the one or more processors of the management system, and the individual information includes at least one of state information indicating a state of the moving body and capability information determined based on a capability of the moving body.

22. The management system according to claim 21, wherein the individual information includes state information indicating a state of the moving body.

23. The management system according to claim 22, wherein the state information is movement velocity information indicating a movement velocity of the moving body, and the one or more processors of the management system determine the priority/subordination degree of a moving body for which the movement velocity information indicates a first movement velocity to be lower than the priority/subordination degree of a moving body for which the movement velocity information indicates a second movement velocity that is less than the first movement velocity.

24. The management system according to claim 22, wherein the state information is movement altitude information indicating a movement altitude of the moving body, and the one or more processors of the management system determine the priority/subordination degree of a moving body for which the movement altitude information indicates a first movement altitude to be lower than the priority/subordination degree of a moving body for which the movement altitude information indicates a second movement altitude that is less than the first movement altitude.

25. The management system according to claim 22, wherein the state information is remaining capacity information indicating a remaining capacity of a propulsion energy source of the moving body, and the one or more processors of the management system determine the priority/subordination degree of a moving body for which the remaining capacity information indicates a first remaining capacity to be lower than the priority/subordination degree of a moving body for which the remaining capacity information indicates a second remaining capacity that is less than the first remaining capacity.

26. The management system according to claim 22, wherein the state information is movable distance information indicating a movable distance using a propulsion energy source of the moving body, and the one or more processors of the management system determine the priority/subordination degree of a moving body for which the movable distance information indicates a first movable distance to be lower than the priority/subordination degree of a moving body for which the movable distance information indicates a second movable distance that is shorter than the first movable distance.

27. The management system according to claim 21, wherein the individual information includes capability information determined based on a capability of the moving body.

28. The management system according to claim 27, wherein the capability information is maximum velocity information determined based on a maximum velocity of the moving body, and the one or more processors of the management system determine the priority/subordination degree of a moving body for which the maximum velocity information indicates a first maximum velocity to be lower than the priority/subordination degree of a moving body for which the maximum velocity information indicates a second maximum velocity that is less than the first maximum velocity.

29. The management system according to claim 28, wherein the maximum velocity is a maximum velocity in a vertical direction.

30. The management system according to claim 27, wherein the capability information is maximum output information determined based on a maximum output of a propulsion apparatus included in the moving body, and the one or more processors of the management system determine the priority/subordination degree of a moving body for which the maximum output information indicates a first maximum output to be lower than the priority/subordination degree of a moving body for which the maximum output information indicates a second maximum output that is less than the first maximum output.

31. The management system according to claim 1, wherein the individual information includes geographic information determined based on a geographic unit classification into which the moving body is permitted to enter.

32. The management system according to claim 7, wherein the display apparatus is fixed to the ground and configured to perform display directed outward, and the one or more processors of the management system control the display of the display apparatus according to the priority/subordination degree of the autonomous moving body, when the autonomous moving body passes through a vicinity of the other display apparatus.

33. The management system according to claim 7, comprising;

a portable terminal including a display screen; and wherein the one or more processors of the management system control the display of the display screen, wherein the one or more processors of the management system control the display of the display screen according to the priority/subordination degree of the autonomous moving body, when the autonomous moving body passes through a vicinity of the portable terminal.

34. The management system according to claim 33, wherein the one or more processors of the management system cause the display screen to display information concerning the priority/subordination degree and movement state information indicating a movement state of the autonomous moving body, when the autonomous moving body passes through the vicinity of the portable terminal.

* * * * *